US012800015B2

(12) United States Patent
Nakabayashi et al.

(10) Patent No.: US 12,800,015 B2
(45) Date of Patent: Nov. 17, 2026

(54) NUT AND BALL SCREW DEVICE

(71) Applicant: NSK Ltd., Tokyo (JP)

(72) Inventors: Yuta Nakabayashi, Kanagawa (JP); Kazutaka Tanaka, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 19/108,201

(22) PCT Filed: Aug. 24, 2023

(86) PCT No.: PCT/JP2023/030514

§ 371 (c)(1),
(2) Date: Mar. 3, 2025

(87) PCT Pub. No.: WO2024/053415

PCT Pub. Date: Mar. 14, 2024

(65) Prior Publication Data

US 2026/0063189 A1 Mar. 5, 2026

(30) Foreign Application Priority Data

Sep. 8, 2022 (JP) ................................ 2022-142738

(51) Int. Cl.
*F16H 25/22* (2006.01)
*F16H 25/20* (2006.01)
*F16H 25/24* (2006.01)

(52) U.S. Cl.
CPC ..... *F16H 25/2223* (2013.01); *F16H 25/2015* (2013.01); *F16H 25/24* (2013.01)

(58) Field of Classification Search
CPC .. F16H 25/2223; F16H 25/24; F16H 25/2204; F16H 2025/2481
See application file for complete search history.

(56) References Cited

U.S. PATENT DOCUMENTS 9,927,011 B2 * 3/2018 Iwasaki ............... F16H 25/2223
10,641,370 B2 * 5/2020 Kreutzer ............ F16H 25/2223
2019/0009814 A1 1/2019 Ohashi

FOREIGN PATENT DOCUMENTS

EP 3 208 164 A1 8/2017
JP 2001165274 A * 6/2001
JP 3111878 U 7/2005
JP 2014-92223 A 5/2014
(Continued)

OTHER PUBLICATIONS

Notification of Reasons for Refusal of Japanese Application No. 2023-574846 dated Jan. 23, 2024.
(Continued)

*Primary Examiner* — Jake Cook
(74) *Attorney, Agent, or Firm* — Sughrue Mion, PLLC

(57) ABSTRACT

A nut of the present disclosure includes a cylindrical nut main body penetrated by a screw shaft, a plurality of inner peripheral raceway surfaces and a plurality of S-shaped groove surfaces recessed to an outer side in a radial direction from an inner peripheral surface of the nut main body, and a flange protruding to the outer side in the radial direction from an outer peripheral surface of the nut main body. The flange includes at least one or more partial flanges extending only in a part of a circumferential direction along the outer peripheral surface of the nut main body.

10 Claims, 14 Drawing Sheets

(56) References Cited

FOREIGN PATENT DOCUMENTS

| | | | |
|---|---|---|---|
| JP | 2015-204719 | A | 11/2015 |
| JP | 2019-14358 | A | 1/2019 |
| JP | 2021-95924 | A | 6/2021 |

OTHER PUBLICATIONS

Decision to Grant A Patent of Japanese Application No. 2023-574846 dated Mar. 19, 2024.

International Search Report for PCT/JP2023/030514 dated Nov. 7, 2023 (PCT/ISA/210).

* cited by examiner

NUT AND BALL SCREW DEVICE

CROSS REFERENCE TO RELATED APPLICATIONS

This application is a National Stage of International Application No. PCT/JP2023/030514 filed Aug. 24, 2023, claiming priority based on Japanese Patent Application No. 2022-142738 filed Sep. 8, 2022.

FIELD

The present disclosure relates to a nut and a ball screw device.

BACKGROUND

A ball screw device includes a screw shaft, a nut penetrated by the screw shaft, and a plurality of balls arranged between the screw shaft and the nut. An outer peripheral raceway surface is provided on an outer peripheral surface of the screw shaft. An inner peripheral raceway surface facing the outer peripheral raceway surface is provided on an inner peripheral surface of the nut. A spiral raceway is formed between the outer peripheral raceway surface and the inner peripheral raceway surface.

The plurality of balls is arranged in the raceway. In addition, the ball screw device includes a circulation portion that circulates the balls. An example of the circulation portion is an S-shaped groove surface molded in the inner peripheral surface of the nut. According to this S-shaped groove surface, the balls moved for one lead can be returned by one lead. In addition, as disclosed in the following Patent Literature, the nut may have a flange protruding to an outer side in a radial direction.

CITATION LIST

Patent Literature

Patent Literature 1: European Patent Application Laid-open No. 003208164

SUMMARY

Technical Problem

Incidentally, in a case where an S-shaped groove surface is molded in an inner peripheral surface of a nut by forging, when a flange is provided on an outer side in a radial direction, a thick portion of the nut hardly escapes to the outer side in the radial direction, and it is difficult to mold the S-shaped groove surface. For this reason, the S-shaped groove surface is molded in a manner of being shifted in an axial direction with respect to the flange. On the other hand, since the S-shaped groove surface and an inner peripheral raceway surface are not provided on an inner side in the radial direction of the flange, there is a problem that a size of the nut is increased in the axial direction.

The present disclosure has been made in view of the above, and an object thereof is to provide a nut that can avoid an increase in size in an axial direction, and a ball screw device including the nut.

Solution to Problem

To achieve the above object, a nut according to an embodiment of the present disclosure comprising: a cylindrical nut main body penetrated by a screw shaft; a plurality of inner peripheral raceway surfaces and a plurality of S-shaped groove surfaces recessed to an outer side in a radial direction from an inner peripheral surface of the nut main body; and a flange that protrudes to the outer side in the radial direction from an outer peripheral surface of the nut main body, wherein the flange has at least one or more partial flanges extending only in a part of a circumferential direction along the outer peripheral surface of the nut main body, a space between one end and another end of the partial flange in the circumferential direction in a case where number of the partial flanges is one, and a space between the partial flanges adjacent to each other in the circumferential direction in a case where the number of the partial flanges is two or more is a relief space to which a thick portion of the nut main body is released, and one of the plurality of S-shaped groove surfaces is arranged on an inner side in the radial direction of the relief space.

According to the present disclosure, a thick portion of a nut main body can be released into a relief space. That is, an S-shaped groove surface can be molded by forging in a portion of the nut main body which portion is arranged on an inner side in a radial direction with respect to the relief space. As a result, it is not necessary to mold the S-shaped groove surface in a manner of being shifted in the axial direction with respect to a flange (partial flange), and an increase in size of the nut in the axial direction is avoided. Furthermore, according to the present disclosure, the nut is lighter than a case where a flange is annular.

As a preferable embodiment of the nut, the plurality of S-shaped groove surfaces is arranged at equal intervals in the circumferential direction.

The nut supports a screw shaft from an outer side in the radial direction via a ball. Note that an inner peripheral raceway surface extends in a circumferential direction, and a range supported from the outer side in the radial direction extends in the circumferential direction. On the other hand, a portion where an S-shaped groove surface is provided in the circumferential direction cannot support the screw shaft from the outer side in the radial direction. According to the above configuration, the range in which the screw shaft cannot be supported from the outer side in the radial direction is dispersed in the circumferential direction. Thus, the screw shaft can be supported from all directions in the circumferential direction.

In the nut, the flange may have two or more of the partial flanges arranged at equal intervals in the circumferential direction.

As a preferable embodiment of the nut, a shaft supported by a housing and extending in an axial direction parallel to the screw shaft is arranged on the outer side in the radial direction of the partial flange, and a sliding groove surface that is recessed to the inner side in the radial direction and that houses the shaft inside is provided in an outer peripheral surface of the partial flange.

According to the above configuration, the nut is supported by a housing in such a manner as to be non-rotatable and movable in the axial direction.

As a preferable embodiment of the nut, a planetary gear of a planetary gear mechanism and the partial flange face each other in an axial direction parallel to the screw shaft, and a hole into which a transmission shaft that supports the planetary gear is inserted is provided in the partial flange.

According to the above configuration, a rotary motion of a planetary gear revolving around a sun gear is transmitted to the partial flange. Thus, a carrier that supports the planetary gear becomes unnecessary, and the number of components is reduced.

As a preferable embodiment of the nut, the nut main body is arranged inside a driven pulley, and the partial flange is inserted into a groove provided in an inner peripheral surface of the driven pulley.

According to the above configuration, the nut and a driven pulley rotate integrally.

As a preferable embodiment of the nut, a protrusion that protrudes in an axial direction and comes into contact with a stopper that does not perform a relative rotation with the screw shaft is provided on one end surface of the nut main body, and the S-shaped groove surface arranged closest to the protrusion in the axial direction among the plurality of S-shaped groove surfaces is arranged in a manner of being shifted in the circumferential direction with respect to the protrusion.

According to the above configuration, it is possible to avoid that a contact load caused by a stopper is input to a protrusion and an S-shaped groove surface arranged nearby is deformed. In addition, it is also possible to avoid deformation of the protrusion by a load of when an inner peripheral surface of the nut is forged. That is, an initial positional displacement is also avoided.

To achieve the above object, a ball screw device according to the present disclosure comprising: a screw shaft; the above nut; and a plurality of balls arranged between the screw shaft and the nut.

According to the present disclosure, an increase in size of the nut in the axial direction is avoided.

Furthermore, the nut is lighter than a case where the flange is annular.

Advantageous Effects of Invention

According to the present disclosure, an increase in size of the nut in the axial direction is avoided.

DESCRIPTION OF EMBODIMENTS

A mode to carry out the present disclosure will be described in detail with reference to the drawings. The present disclosure is not limited by contents described in the following description. In addition, components described in the following include what can be easily assumed by those skilled in the art and what is substantially the same. Furthermore, the components described in the following can be arbitrarily combined.

First Embodiment

Figure 1:
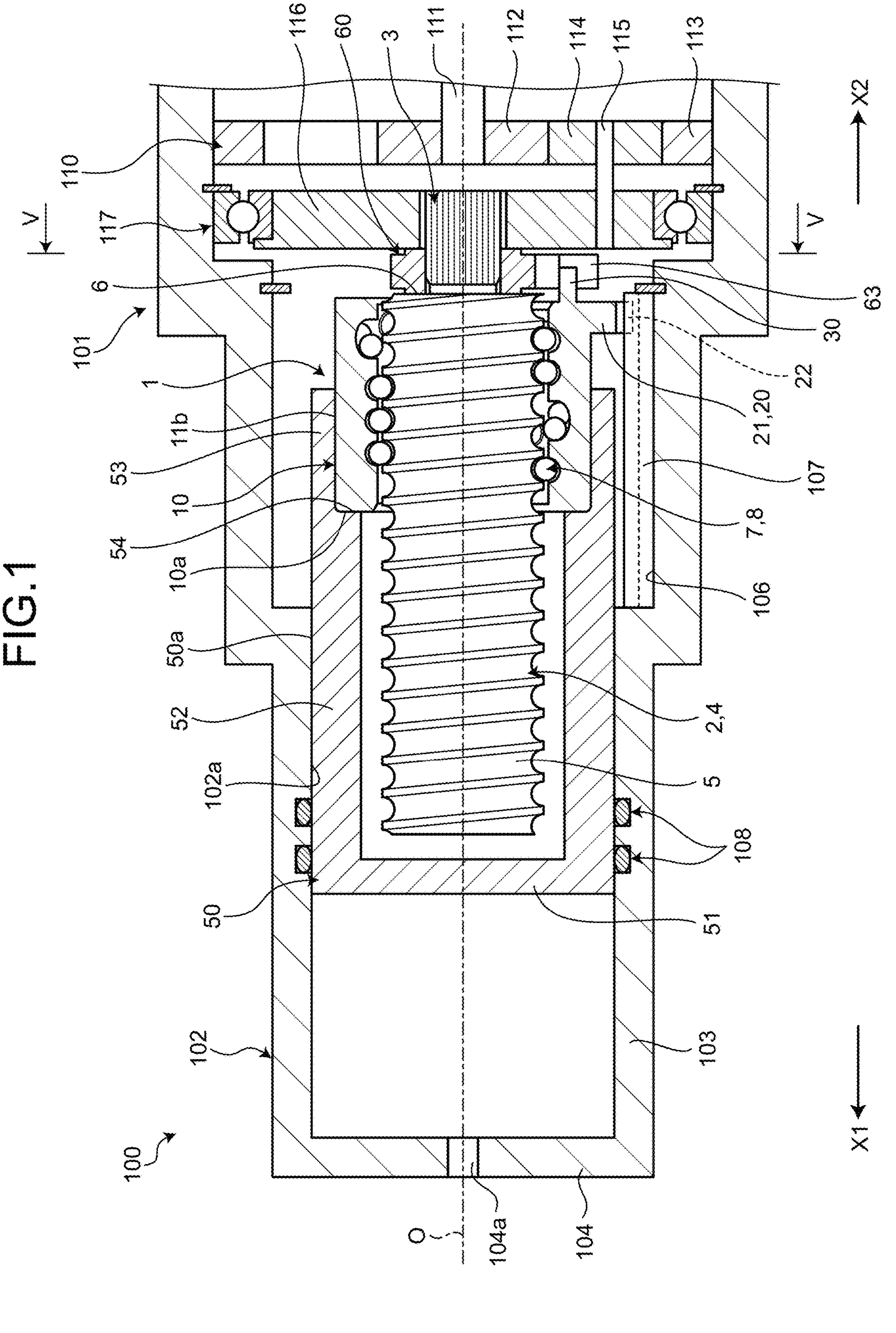
FIG. 1 is a cross-sectional view of a brake booster of a first embodiment in an axial direction in a state before operation.

FIG. 1 is a cross-sectional view of a brake booster of the first embodiment in an axial direction in a state before operation. In the first embodiment, an example in which an electric actuator of the present disclosure is applied to a brake booster of a brake system will be described. Note that the electric actuator of the present disclosure may be applied to other devices such as a brake caliper in addition to the brake booster described in the embodiment.

As illustrated in FIG. 1, an electric actuator 100 of the first embodiment includes a housing 101, a motor (not illustrated), a planetary gear mechanism 110, a ball screw device 1, a piston 50, and a stopper 60.

Hereinafter, a direction parallel to a central axis O of a screw shaft 2 of the ball screw device 1 is referred to as an axial direction. In addition, in the axial direction, a direction in which the piston 50 is arranged as viewed from the planetary gear mechanism 110 is referred to as a first direction X1, and a direction opposite to the first direction is referred to as a second direction X2.

A cylinder 102 is provided at an end in the first direction X1 of the housing 101. The cylinder 102 includes a cylindrical portion 103 having a cylindrical shape centered on the central axis O, and a closing wall 104 that closes an opening of the cylindrical portion 103 in the first direction X1. The piston 50 is inserted into an opening of the cylindrical portion 103 in the second direction X2. Thus, an internal space of the cylinder 102 is closed. Liquid (not illustrated) is sealed in the internal space of the cylinder 102. A through hole 104*a* is provided in the closing wall 104. When the piston 50 moves in the first direction X1, a hydraulic pressure of the liquid increases. Then, the increased hydraulic pressure is transmitted to the brake system via the through hole 104*a*.

The planetary gear mechanism 110 includes an input shaft 111, a sun gear 112, a ring gear 113, a plurality of planetary gears 114, a plurality of transmission shafts 115, and a carrier 116.

A rotary motion of the motor is input to the input shaft 111. The input shaft 111 is arranged coaxially with the central axis O. The sun gear 112 is penetrated by the input shaft 111, and is non-rotatably fixed to the input shaft 111. The ring gear 113 is an internal gear centered on the input shaft 111. An outer peripheral surface of the ring gear 113 is fitted to the housing 101.

The planetary gears 114 are arranged between the sun gear 112 and the ring gear 113. In addition, the planetary gears 114 are meshed with the sun gear 112 and the ring gear 113. The planetary gears 114 are penetrated by the transmission shafts 115. In addition, the planetary gears 114 are rotatably supported around the transmission shafts 115.

The carrier 116 is an annular component centered on the central axis O. An outer peripheral surface of the carrier 116 is fitted to an inner ring of a bearing 117. Thus, the carrier 116 is rotatably supported by the housing 101. The screw shaft 2 penetrates a central portion of the carrier 116. The carrier 116 and the screw shaft 2 are spline-fitted. Thus, the carrier 116 and the screw shaft 2 are coupled in such a manner that relative rotation cannot be performed. In addition, the transmission shafts 115 penetrate a position eccentric to the outer side in the radial direction from the central portion of the carrier 116.

As described above, according to the planetary gear mechanism 110, when the rotary motion is input to the input shaft 111, the sun gear 112 rotates around the central axis O. Then, the planetary gears 114 rotate (revolve) around the central axis O while rotating (rotating) around the transmission shafts 115. As a result, the carrier 116 and the screw shaft 2 rotate around the central axis O. A rotational speed of the screw shaft 2 is decelerated more than a rotational speed of the input shaft 111.

The ball screw device 1 includes the screw shaft 2, a nut 10, and a plurality of balls 8. The screw shaft 2 includes a male spline portion 3 coupled to the carrier 116, and a screw shaft main body 4 arranged in the first direction X1 with respect to the male spline portion 3. An outer peripheral raceway surface 5 extending in a spiral direction is provided on an outer peripheral surface of the screw shaft main body 4.

The male spline portion 3 has a smaller diameter than the screw shaft main body 4. Thus, a stepped surface 6 facing the second direction X2 is provided between the male spline portion 3 and the screw shaft main body 4. The stepped surface 6 abuts on a side surface of the stopper 60. In addition, the stopper 60 abuts on a side surface of the carrier 116. Thus, the screw shaft 2 is unmovably fixed in the second direction X2. Furthermore, the male spline portion 3 is press-fitted into the carrier 116, and the screw shaft 2 is unmovably fixed in the first direction X1. Note that the male spline portion 3 may be fitted to the carrier 116 with a gap in the present disclosure. In such a case, a retaining ring abutting on the carrier 116 in the second direction X2 may be provided in the male spline portion 3 to prevent the screw shaft 2 from coming off. Note that in the present disclosure, a caulking portion that abuts on the carrier 116 in the second direction X2 may be provided instead of the retaining ring, or the carrier 116 and the male spline portion 3 may be welded instead of the retaining ring.

Figure 2:
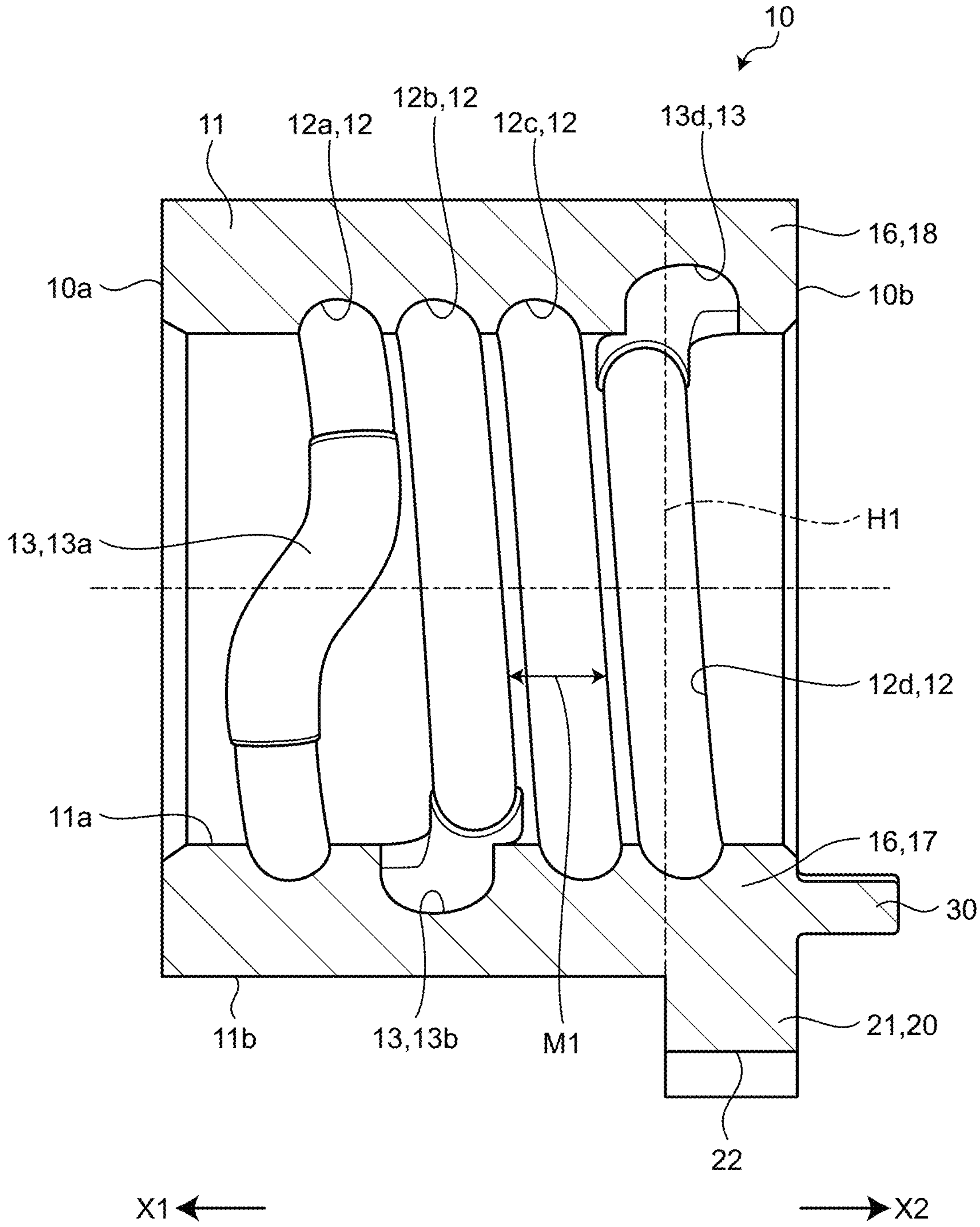
FIG. 2 is an enlarged view of a part of a nut illustrated in FIG. 1.

FIG. 2 is an enlarged view of a part of the nut illustrated in FIG. 1. As illustrated in FIG. 2, the nut 10 includes a nut main body 11, a plurality of inner peripheral raceway surfaces 12, a plurality of S-shaped groove surfaces 13, a flange 20, and a protrusion 30.

The nut main body 11 has a cylindrical shape centered on the central axis O. The nut main body 11 has a first end surface 10*a* facing the first direction X1, and a second end surface 10*b* facing the second direction X2. The first end surface 10*a* is a pressing surface that presses the piston 50 (see FIG. 1).

The inner peripheral raceway surfaces 12 and the plurality of S-shaped groove surfaces 13 are groove surfaces provided in an inner peripheral surface 11*a* of the nut main body 11. The inner peripheral raceway surfaces 12 face the outer peripheral raceway surface 5 of the screw shaft 2 (see FIG. 1) and extends in the spiral direction.

The inner peripheral raceway surfaces 12 extend for one round (one lead) in the spiral direction. A raceway 7 (see FIG. 1) is formed between each of the inner peripheral raceway surfaces 12 and the outer peripheral raceway surface 5. Then, the plurality of balls 8 (see FIG. 1) is arranged on each of the raceways 7.

The S-shaped groove surfaces 13 are groove surfaces molded in the inner peripheral surface 11*a* of the nut main body 11 by forging. Each of the S-shaped groove surfaces 13 is connected to one end and the other end of one of the inner peripheral raceway surfaces 12 in the spiral direction. As a result, the balls 8 moved from one end to the other end of the raceway 7 circulate to the one end of the raceway 7 by the S-shaped groove surface 13.

As illustrated in FIG. 2, four inner peripheral raceway surfaces 12 and four S-shaped groove surfaces 13 are provided. Thus, the number of raceways 7 is also four. Hereinafter, the four inner peripheral raceway surfaces 12 will be referred to as a first inner peripheral raceway surface 12*a*, a second inner peripheral raceway surface 12*b*, a third inner peripheral raceway surface 12*c*, and a fourth inner peripheral raceway surface 12*d* in this order in the first direction X1. In addition, the four S-shaped groove surfaces 13 are referred to as a first S-shaped groove surface 13*a*, a second S-shaped groove surface 13*b*, a third S-shaped groove surface 13*c* (see FIG. 3), and a fourth S-shaped groove surface 13*d* in this order in the first direction X1.

Figure 3:
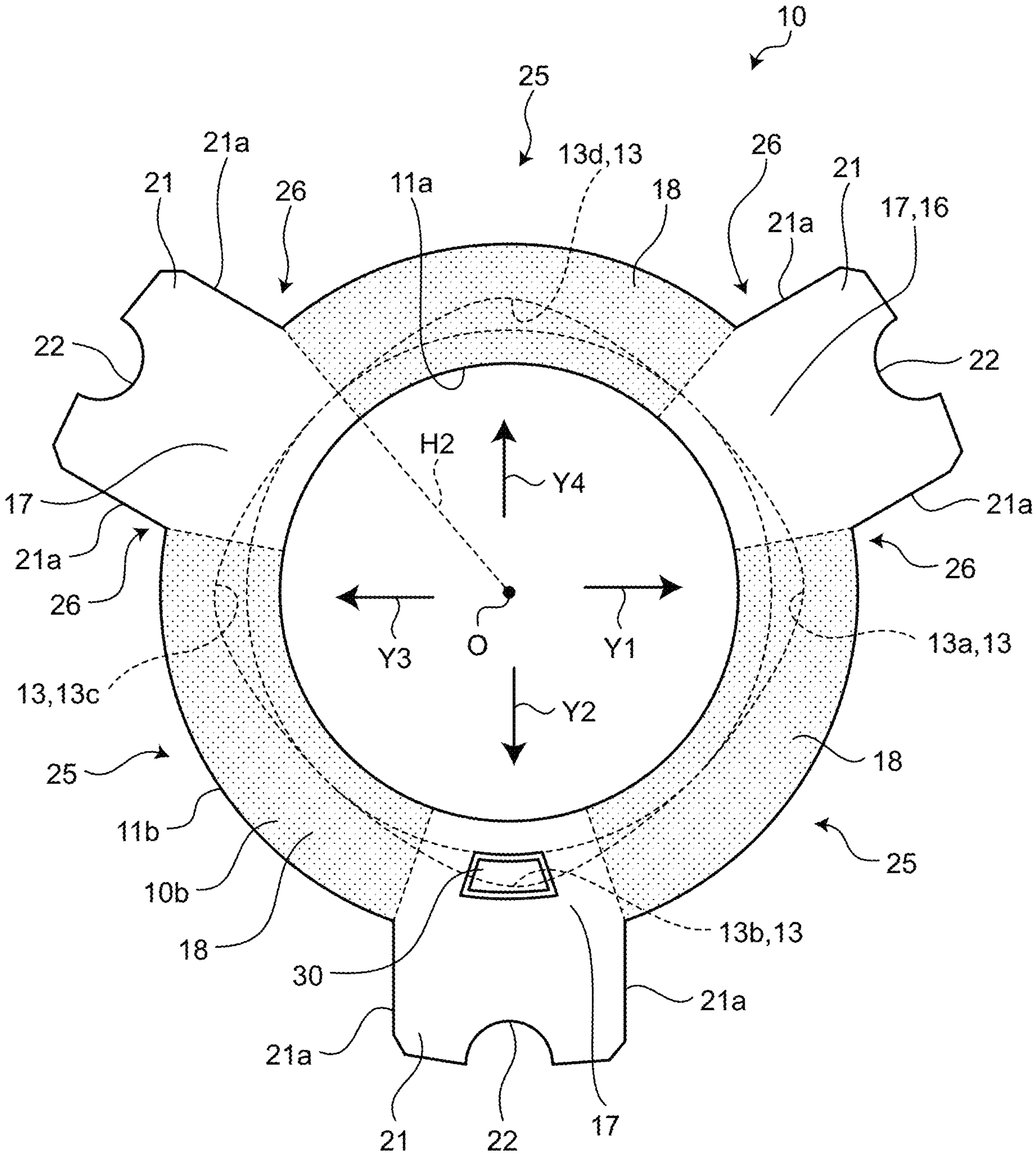
FIG. 3 is a view of the nut of the first embodiment as viewed in a second direction.

FIG. 3 is a view of the nut of the first embodiment as viewed in the second direction. As illustrated in FIG. 3, when viewed in the second direction X2, the second S-shaped groove surface 13*b* is arranged in a manner of being shifted from the first S-shaped groove surface 13*a* by 90 degrees in a clockwise direction. When viewed in the second direction X2, the third S-shaped groove surface 13*c* is arranged in a manner of being shifted from the second S-shaped groove surface 13*b* by 90 degrees in the clockwise direction. When viewed in the second direction X2, the fourth S-shaped groove surface 13*d* is arranged in a manner of being shifted from the third S-shaped groove surface 13*c* by 90 degrees in the clockwise direction. Thus, the four S-shaped groove surfaces 13 are arranged at intervals of 90 degrees (equal intervals) around the central axis O.

Here, the first inner peripheral raceway surface 12*a* of the nut 10 supports the screw shaft 2 from the outer side in the radial direction via the balls 8. On the other hand, the first S-shaped groove surface 13*a* connected to the first inner peripheral raceway surface 12*a* cannot support the screw shaft 2 via the balls 8. Thus, the first inner peripheral raceway surface 12*a* cannot support a load in a direction in which the first S-shaped groove surface 13*a* is arranged when viewed from the central axis O (see arrow Y1 in FIG. 3). Similarly, the second inner peripheral raceway surface 12*b* cannot support a load in a direction in which the second S-shaped groove surface 13*b* is arranged when viewed from the central axis O (see arrow Y2 in FIG. 3). The third inner peripheral raceway surface 12*c* cannot support a load in a direction in which the third S-shaped groove surface 13*c* is arranged when viewed from the central axis O (see arrow Y3 in FIG. 3). The fourth inner peripheral raceway surface 12*d* cannot support a load in a direction in which the fourth S-shaped groove surface 13*d* is arranged when viewed from the central axis O (see arrow Y4 in FIG. 3). In the present embodiment, the four S-shaped groove surfaces 13 are dispersed in the circumferential direction, and ranges that cannot be supported from the outer side in the radial direction do not overlap. Thus, the nut 10 supports the screw shaft 2 in all directions in the circumferential direction.

Figure 4:
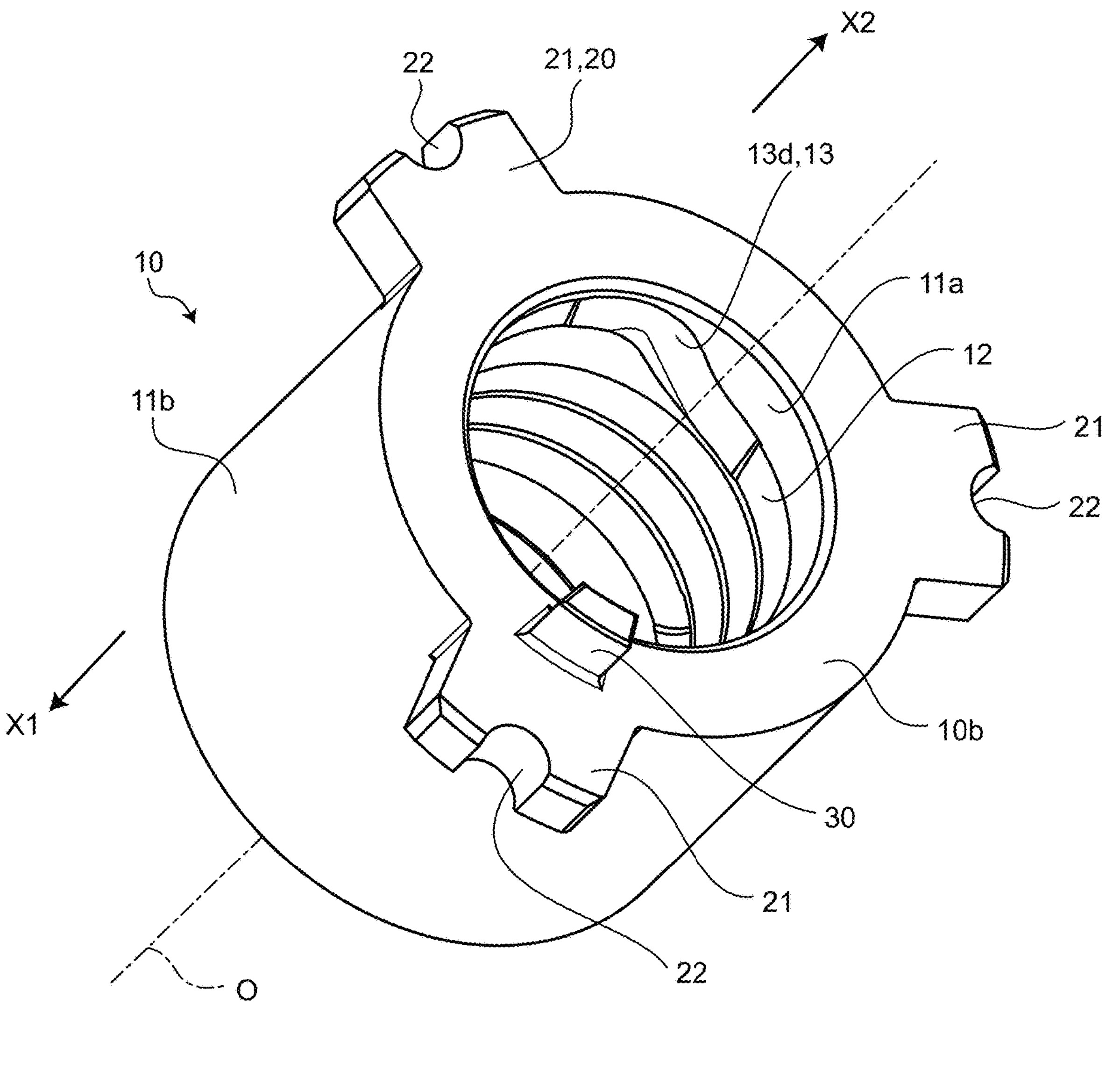
FIG. 4 is a perspective view of the nut of the first embodiment as viewed in the second direction.

FIG. 4 is a perspective view of the nut of the first embodiment as viewed in the second direction. As illustrated in FIG. 4, the flange 20 includes partial flanges 21 protruding in the radial direction from an outer peripheral surface 11*b* of the nut main body 11. The partial flanges 21 are not annular. That is, the partial flanges 21 extend only in a part in the circumferential direction along the outer peripheral surface 11*b* of the nut main body 11. The flange 20 of the present embodiment has the three partial flanges 21. In other words, the flange 20 includes the three partial flanges 21.

The three partial flanges 21 are arranged at equal intervals around the central axis O. That is, the three partial flanges 21 are arranged at intervals of 120 degrees. A surface on the outer side in the radial direction of each of the partial flanges 21 is provided with a sliding groove surface 22 that is recessed to an inner side in the radial direction and is open in the axial direction.

Figure 5:
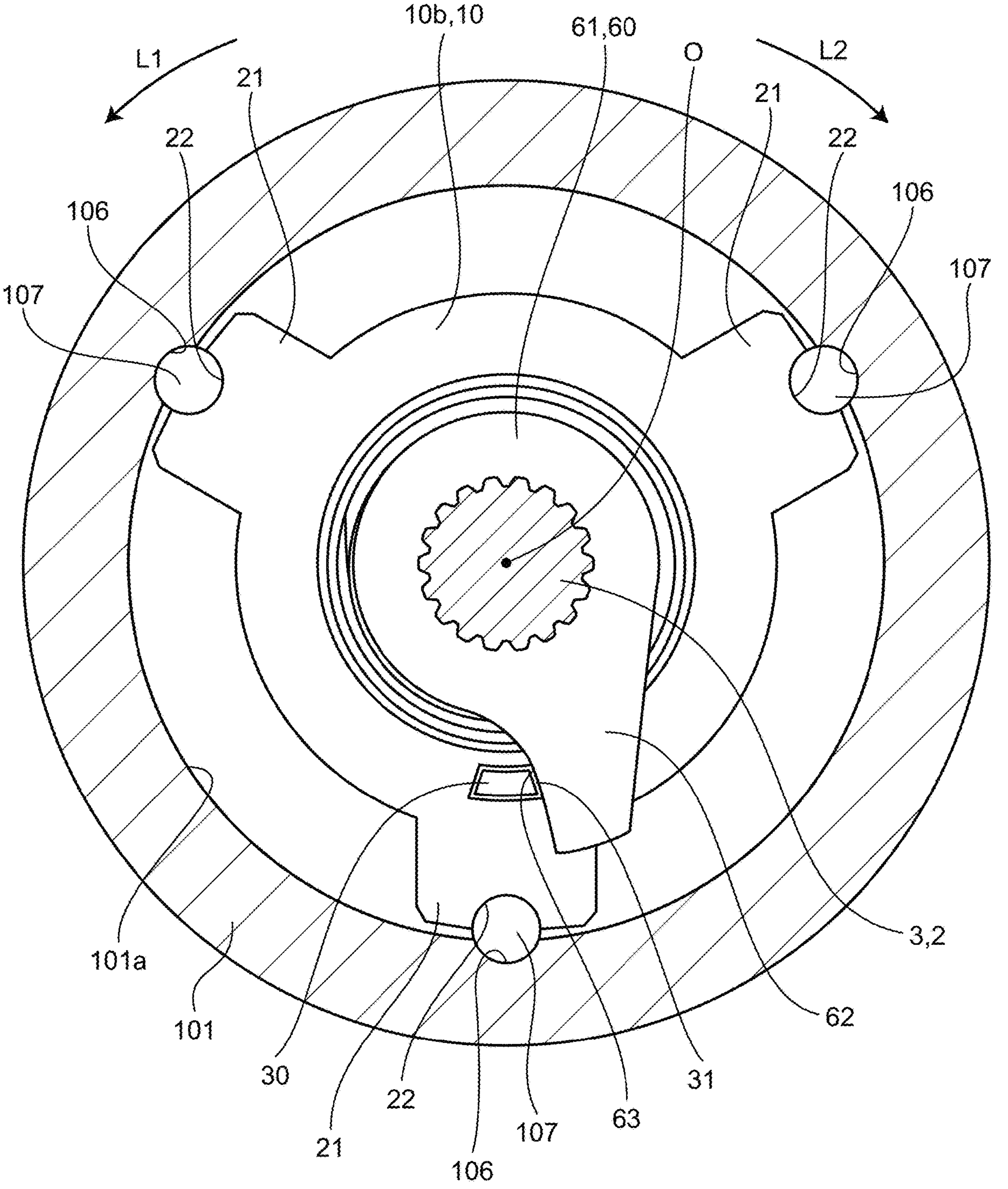
FIG. 5 is a cross-sectional view taken along a line V-V in FIG. 1.

FIG. 5 is a cross-sectional view taken along a line V-V in FIG. 1. As illustrated in FIG. 5, surfaces on the outer side in the radial direction of the partial flanges 21 face an inner surface 101*a* of the housing 101. Three fixing groove surfaces 106 recessed to the outer side in the radial direction are provided in the inner surface 101*a*. The fixing groove surfaces 106 extend in the axial direction (see FIG. 1). A part of a cylindrical shaft 107 extending in the axial direction is housed in an inner side of each of the fixing groove surfaces 106. A portion of the shaft 107 which portion protrudes to the inner side in the radial direction from the inner surface 101*a* of the housing 101 penetrates an inner side of the sliding groove surface 22.

From the above, when a load in a rotational direction acts on the flange 20, the sliding groove surface 22 is caught by the shaft 107, and the rotation of the flange 20 is restricted. In addition, when the load in the axial direction acts on the flange 20, the nut 10 moves in the axial direction while the sliding groove surface 22 slides on the shaft 107. The nut 10 is supported by the housing 101 in such a manner as to be non-rotatable and movable in the axial direction.

As illustrated in FIG. 5, the protrusion 30 protrudes in the second direction X2 from the second end surface 10*b* of the nut main body 11. In addition, the stopper 60 is arranged in the second direction X2 of the nut 10. The stopper 60 includes an annular female spline portion 61 spline-fitted to the male spline portion 3, and a protrusion portion 62 protruding to the outer side in the radial direction from the female spline portion 61. The stopper 60 does not perform a relative rotation with the screw shaft 2. That is, the stopper 60 rotates integrally with the screw shaft 2. In addition, the protrusion portion 62 of the stopper 60 abuts on the protrusion 30 in the clockwise direction as viewed in the second direction X2.

Hereinafter, a rotational direction of the screw shaft 2 is based on a case of being viewed in the second direction X2. Specifically, as illustrated in FIG. 5, in a case where the screw shaft 2 rotates in a counterclockwise direction (counterclockwise direction) as viewed in the second direction X2, the rotational direction is referred to as a first rotational direction L1 (see an arrow in FIG. 5). In addition, in a case where the screw shaft 2 rotates in the clockwise direction (clockwise direction) as viewed in the second direction X2, the rotational direction is referred to as a second rotational direction L2 (see an arrow in FIG. 5). Furthermore, in a case where the screw shaft 2 rotates in the first rotational direction L1, the nut 10 moves in the first direction X1.

The protrusion 30 has a first contact surface 31 of a side surface facing the first rotational direction L1. The protrusion portion 62 of the stopper 60 has a second contact surface 63 of a side surface facing the second rotational direction L2. In a case where the nut 10 is at an initial position in the axial direction, the first contact surface 31 of the protrusion 30 and the second contact surface 63 of the stopper 60 abut on each other.

Thus, when the nut 10 located in the first direction X1 with respect to the initial position moves in the second direction X2, the protrusion 30 enters a track of the stopper 60 that rotates integrally with the screw shaft 2 in the second rotational direction L2. Then, the first contact surface 31 of the protrusion 30 and the second contact surface 63 of the stopper 60 come into contact with each other. As a result, the rotation of the screw shaft 2 is restricted, and the nut 10 is arranged at the initial position.

As illustrated in FIG. 1, the piston 50 includes a pressing portion 51 having a disk shape around the central axis O, a cylindrical portion 52 having a cylindrical shape and extending in the second direction X2 from the pressing portion 51, and a fitting portion 53 fitted to the outer peripheral surface 11*b* of the nut 10.

The pressing portion 51 is a portion that presses the liquid in the cylinder 102 in the first direction X1. The pressing portion 51 is arranged inside the cylinder 102, and faces the closing wall 104 of the cylinder 102.

An inner diameter of the fitting portion 53 is larger than an inner diameter of the cylindrical portion 52. Thus, a stepped surface 54 facing the second direction X2 is provided between an inner peripheral surface of the cylindrical portion 52 and an inner peripheral surface of the fitting portion 53. The stepped surface 54 abuts on the first end surface 10*a* of the nut 10. Note that the hydraulic pressure of the liquid in the cylinder 102 acts on the pressing portion 51, and the piston 50 is constantly pressed in the second direction X2. Thus, the stepped surface 54 and the first end surface 10*a* constantly abut on each other.

Outer diameters of the cylindrical portion 52 and the fitting portion 53 are slightly smaller than an inner diameter of the cylinder 102. Thus, a minute gap (not illustrated) is provided between an outer peripheral surface 50*a* of the piston 50 and an inner peripheral surface 102*a* of the cylinder 102. As a result, when the load in the axial direction acts, the piston 50 moves in the axial direction while sliding on the inner peripheral surface 102*a* of the cylinder 102.

Two seal members 108 are provided between the piston 50 and the cylinder 102. This prevents the liquid in the cylinder 102 from passing through the minute gap between the piston 50 and the cylinder 102 and leaking in the second direction X2.

From the above, when the nut 10 moves in the first direction X1, the first end surface 10*a* presses the stepped surface 54, and the piston 50 moves in the first direction X1. As a result, the hydraulic pressure in the cylinder 102 increases. On the other hand, when the nut 10 moves in the second direction X2, the piston 50 also moves in the second direction X2. As a result, the hydraulic pressure in the cylinder 102 decreases.

Next, details of the nut 10 of the first embodiment will be described. As illustrated in FIG. 2, a length of the partial flanges 21 in the axial direction is shorter than a length of the nut main body 11 in the axial direction. Specifically, the length of the partial flanges 21 in the axial direction is about the same as a length in the axial direction M1 of the raceways 7 (one lead). In addition, the partial flanges 21 are arranged at an end of the nut main body 11 in the second direction X2.

As illustrated in FIG. 3, each of the partial flanges 21 has side surfaces 21*a* facing the circumferential direction. A corner portion 26 is provided at a portion where each of the side surfaces 21*a* and the outer peripheral surface 11*b* of the nut main body 11 intersect. In addition, a relief space 25 is provided between the side surfaces 21*a* of the partial flanges 21. That is, the three relief spaces 25 are arranged on an outer peripheral side of the nut main body 11.

As illustrated in FIG. 2, a portion of the nut main body 11 which portion is arranged on the inner side in the radial direction of the flange 20 (portion arranged in the second direction X2 from a broken line H1 in FIG. 2) is referred to as an annular portion 16. The annular portion 16 is arranged on the inner side in the radial direction of the three partial flanges 21 and the three relief spaces 25. In an inner peripheral surface of the annular portion 16, a part of the fourth S-shaped groove surface 13*d* of the four S-shaped groove surfaces 13 is provided.

As illustrated in FIG. 3, the annular portion 16 is divided into three flange connected regions 17 and three flange non-connected regions 18. Note that dots are added in FIG. 3 in order to make it easier to understand a range of the flange non-connected regions 18. Each of the flange connected regions 17 is a portion of the annular portion 16 in which portion the partial flange 21 is arranged on the outer side in the radial direction and which portion is connected to the partial flange 21. On the other hand, each of the flange non-connected regions 18 is a portion of the annular portion 16 in which portion the relief space 25 is arranged on the outer side in the radial direction and which portion is not connected to the partial flange 21.

More specifically, the flange connected regions 17 and the flange non-connected regions 18 are divided with a virtual straight line H2 connecting the corner portion 26 and the central axis O as a boundary line. In addition, in each of the flange non-connected regions 18, the relief space 25 is arranged on the outer side in the radial direction, and a thick portion of the nut main body 11 can be released to the outer side in the radial direction by forging. That is, the flange non-connected region 18 is a region where the S-shaped groove surface 13 can be molded by forging. In the present embodiment, the fourth S-shaped groove surface 13*d* is molded in the inner peripheral surface 11*a* of the flange non-connected region 18 by forging. As described above, according to the present embodiment, it is not necessary to mold the S-shaped groove surfaces 13 in a manner of being shifted in the axial direction with respect to the flange 20. Thus, it is possible to avoid an increase in size of the nut 10 in the axial direction.

In addition, the fourth S-shaped groove surface 13*d* of the four S-shaped groove surfaces 13 is arranged closest to the protrusion 30 in the axial direction (see FIG. 2). The fourth S-shaped groove surface 13*d* and the protrusion 30 are arranged in a manner of being shifted by 180 degrees in the circumferential direction. Thus, even when a contact load by the stopper 60 is input to the protrusion 30, the fourth S-shaped groove surface 13*d* is not deformed. That is, the balls 8 keep rolling smoothly on the fourth S-shaped groove surface 13*d*. In addition, it is also possible to avoid deformation of the protrusion 30 by a load of when the inner peripheral surface 11*a* of the nut main body 11 is forged. That is, an initial positional displacement is also avoided.

As described above, the ball screw device 1 of the first embodiment includes the screw shaft 2, the nut 10, and the plurality of balls 8 arranged between the screw shaft 2 and the nut 10. The nut 10 includes the cylindrical nut main body 11 penetrated by the screw shaft 2, the plurality of inner peripheral raceway surfaces 12 and the plurality of S-shaped groove surfaces 13 recessed to the outer side in the radial direction from the inner peripheral surface 11*a* of the nut main body 11, and the flange 20 protruding to the outer side in the radial direction from the outer peripheral surface 11*b* of the nut main body 11. The flange 20 includes at least one or more partial flanges 21 extending only in a part in the circumferential direction along the outer peripheral surface 11*b* of the nut main body 11. A space between one end and the other end in the circumferential direction of the partial flange 21 of a case where there is the one partial flange 21, and a space between the partial flanges 21 adjacent in the circumferential direction of a case where there are the two or more partial flanges 21 is the relief space 25 to which the thick portion of the nut main body 11 is released. One S-shaped groove surface 13 (fourth S-shaped groove surface 13*d*) of the plurality of S-shaped groove surfaces 13 is arranged on the inner side in the radial direction of the relief space 25.

According to the first embodiment, an increase in size of the nut 10 in the axial direction is avoided. Furthermore, the nut 10 is lighter than a case where the flange 20 is annular.

In addition, the plurality of S-shaped groove surfaces 13 is arranged at equal intervals in the circumferential direction in the first embodiment.

The range in which the screw shaft 2 cannot be supported from the outer side in the radial direction is dispersed in the circumferential direction. Thus, the nut 10 can support the screw shaft 2 from all directions in the circumferential direction.

In addition, in the first embodiment, the flange 20 has the two or more partial flanges 21 arranged at equal intervals in the circumferential direction.

In addition, in the first embodiment, the shaft 107 supported by the housing 101 and extending in the axial direction parallel to the screw shaft 2 is arranged on the outer side in the radial direction of the partial flanges 21. The sliding groove surface 22 that is recessed to the inner side in the radial direction and that houses the shaft inside is provided in the outer peripheral surface of each of the partial flanges 21.

Thus, the nut 10 is supported by the housing 101 in such a manner as to be non-rotatable and movable in the axial direction.

In addition, in the first embodiment, the protrusion 30 that protrudes in the axial direction and comes into contact with the stopper 60 that does not perform the relative rotation with the screw shaft 2 is provided in one end surface (second end surface 10*b*) of the nut main body 11. The S-shaped groove surface 13 (fourth S-shaped groove surface 13*d*) arranged closest to the protrusion in the axial direction in the plurality of S-shaped groove surfaces 13 is arranged in a manner of being shifted in the circumferential direction with respect to the protrusion 30.

According to the above configuration, the fourth S-shaped groove surface 13*d* and the protrusion 30 are separated from each other. Thus, even when the contact load by the stopper 60 is input to the protrusion 30, the fourth S-shaped groove surface 13*d* is not deformed.

Although the first embodiment has been described above, the present disclosure is not limited to the example described in the first embodiment. For example, although the fourth S-shaped groove surface 13*d* and the protrusion 30 are arranged at an interval of 180 degrees in the embodiment, the present disclosure is not limited thereto. It is sufficient that the fourth S-shaped groove surface 13*d* and the protrusion 30 do not overlap when viewed in the axial direction. For example, the fourth S-shaped groove surface 13*d* and the protrusion 30 may be arranged at an interval of about 30 degrees. Furthermore, the present disclosure may be a nut 10 having no protrusion 30. In addition, although the example in which the sliding groove surface 22 is provided in the outer peripheral surface of each of the partial flanges 21 in order to prevent the rotation of the nut 10 has been described in the embodiment, the present disclosure is not limited thereto. For example, the partial flanges 21 themselves may enter the fixing groove surfaces 106. Alternatively, a protrusion may be provided on an outer peripheral surface of each partial flange 21, and this protrusion may enter the fixing groove surface 106 of the housing 101. Note that the protrusion provided on the outer peripheral surface of the partial flange 21 may be integrated with the partial flange 21 or may be a separate body (component separate from the partial flange 21).

Next, a first modification example and a second modification example in which the nut 10 of the first embodiment is modified will be described. Hereinafter, only changes will be described.

(First Modification Example)

Figure 6:
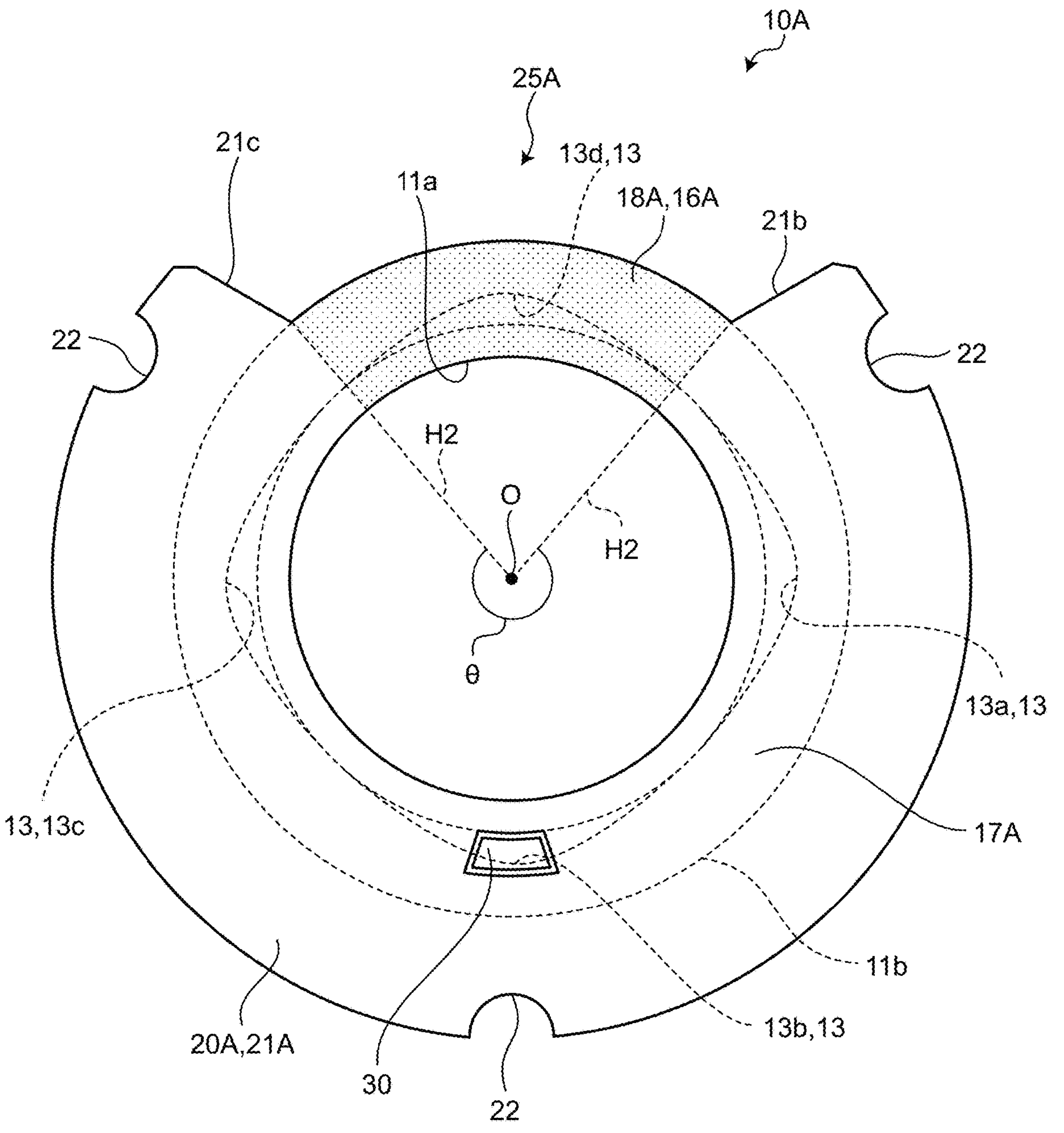
FIG. 6 is a view of a nut of a first modification example as viewed in a second direction.

FIG. 6 is a view of a nut of the first modification example as viewed in a second direction. A nut 10A of the first modification example is different from the nut 10 of the first embodiment in a point that a flange 20A is included instead of the flange 20. The flange 20A has one partial flange 21A. Thus, there is only one space between one end 21*b* and the other end 21*c* in a circumferential direction of the partial flange 21A (relief space 25A). Similarly, an annular portion 16A is divided into one flange connected region 17A and one flange non-connected region 18A. In addition, a fourth S-shaped groove surface 13*d* is provided in the flange non-connected region 18A in which forging is possible.

The partial flange 21A is longer in a circumferential direction than the partial flanges 21 of the first embodiment. Specifically, an angle θ from one end 21*b* to the other end 21*c* of the partial flange 21A is about 300 degrees. Three sliding groove surfaces 22 are provided in an outer peripheral surface of the partial flange 21A. The partial flange 21A has higher rigidity and is less likely to deform than the partial flanges 21 of the first embodiment. Thus, it is avoided that the partial flange 21A is deformed and slidability with respect to a shaft 107 is impaired.

Although the first modification example has been described above, the present disclosure is not specifically limited with respect to the length in the circumferential direction of the partial flange and the number of partial flanges as described in the first modification example.

(Second Modification Example)

Figure 7:
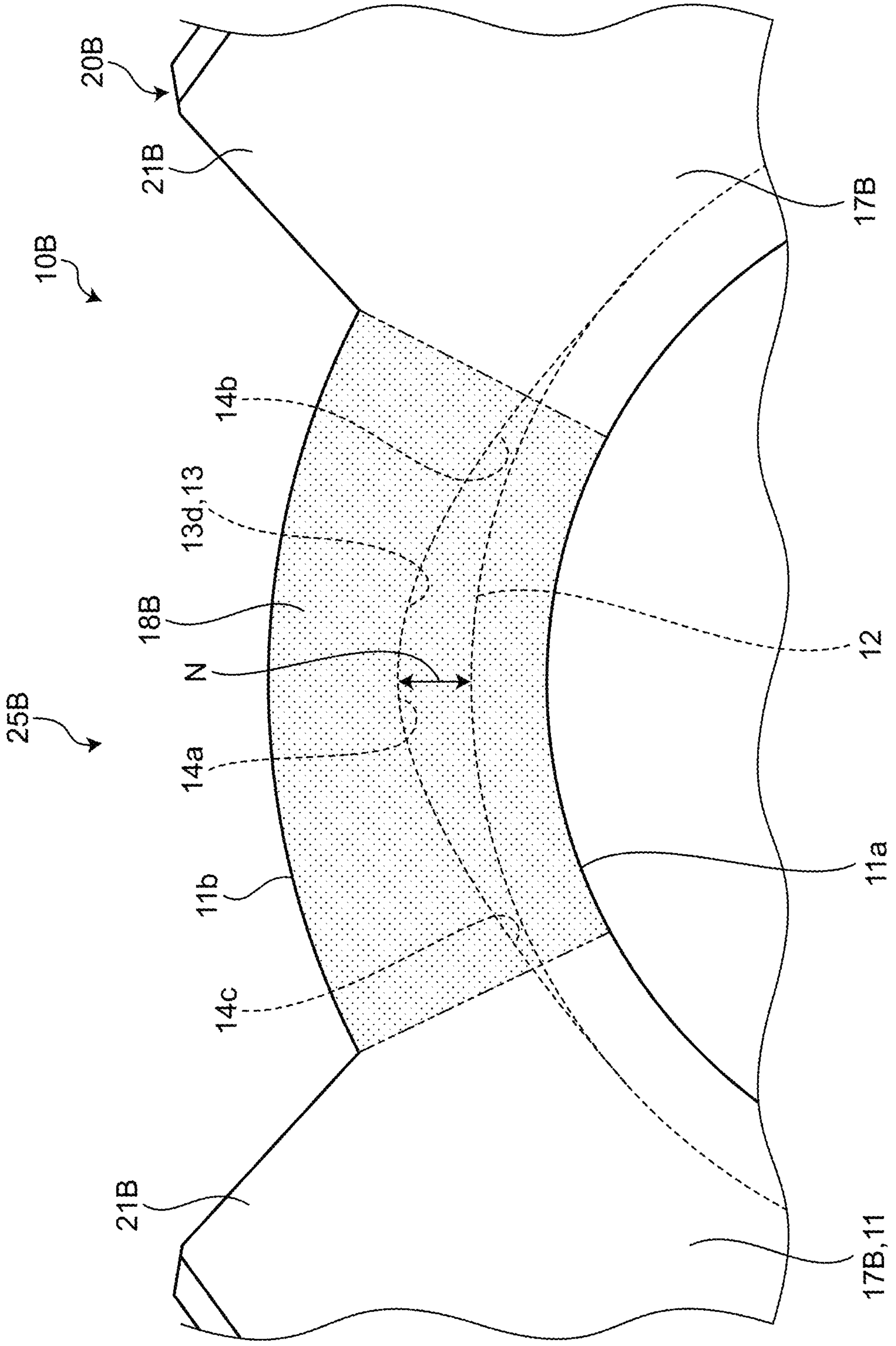
FIG. 7 is a view of a flange unconnected portion of a nut of a second modification example as viewed in a second direction.

FIG. 7 is a view of a flange non-connected region of a nut of the second modification example as viewed in a second direction. As illustrated in FIG. 7, a nut 10B of the second modification example is different from the nut 10 of the first embodiment in a point that a part of a fourth S-shaped groove surface 13*d* is provided in a flange connected region 17B.

More specifically, a central portion in a length direction of an S-shaped groove surface 13 is a bottom surface 14*a* that is the most recessed to an outer side in a radial direction. Both ends in the length direction of the S-shaped groove surface 13 are inclined surfaces 14*b* and 14*c* in which a recess amount gradually increases toward the bottom surface 14*a*. Note that the length direction of the S-shaped groove surface 13 is a direction along the S-shaped groove surface 13, and is also referred to as a direction along an S-shape. At the time of forging, an amount of a thick portion that escapes to an outer side in the radial direction due to molding of the bottom surface 14*a* is large. On the other hand, the amount of the thick portion that escapes to the outer side in the radial direction due to molding of the inclined surfaces 14*b* and 14*c* is smaller than that of the bottom surface 14*a*. In the second modification example, a part of the inclined surfaces 14*b* and 14*c* (portion continuous with an inner peripheral raceway surface 12) of the S-shaped groove surface 13 is provided in the flange connected region 17B. In addition, remaining portions of the inclined surfaces 14*b* and 14*c* (portions continuous with a bottom surface 14) and the bottom surface 14*a* are provided in the flange non-connected region 18B (inner side in the radial direction of a relief space 25B).

As a repetition of the description, when a flange 20B (partial flange 21B) is arranged on the outer side in the radial direction, a large amount of a thick portion of a nut main body 11 cannot be released to the outer side in the radial direction by forging. That is, since it is difficult to mold the bottom surface 14*a*, the entire S-shaped groove surface 13 is not conventionally molded on the inner side in the radial direction of the flange 20 (partial flange 21). On the other hand, even in a case where the flange 20 (partial flange 21) is arranged on the outer side in the radial direction, a small thickness portion can be released to the outer side in the radial direction. That is, even in an inner peripheral surface 11*a* of the flange connected region 17B, a part of the inclined surfaces 14*b* and 14*c* having a small recess amount can be molded by forging.

In the present disclosure, in a case where a part of the inclined surfaces 14*b* and 14*c* can be molded by forging with respect to the flange connected region 17B, the molding may be performed in a manner described in the second modification example. In other words, in the present disclosure, there is no limitation that the entire S-shaped groove surface 13 has to be molded in the flange non-connected region 18B as described in the second modification example, and a degree of freedom of a layout of the S-shaped groove surface 13 is high.

Note that the groove surface that can be molded in the flange connected region 17B (inclined surfaces 14*b* and 14*c*) is limited to a groove surface having a recess amount of 50% or less, preferably, a groove surface having a recess amount of 20% or less with respect to a maximum recess amount N of the bottom surface 14*a* (see FIG. 7).

(Third Modification Example)

Figure 8:
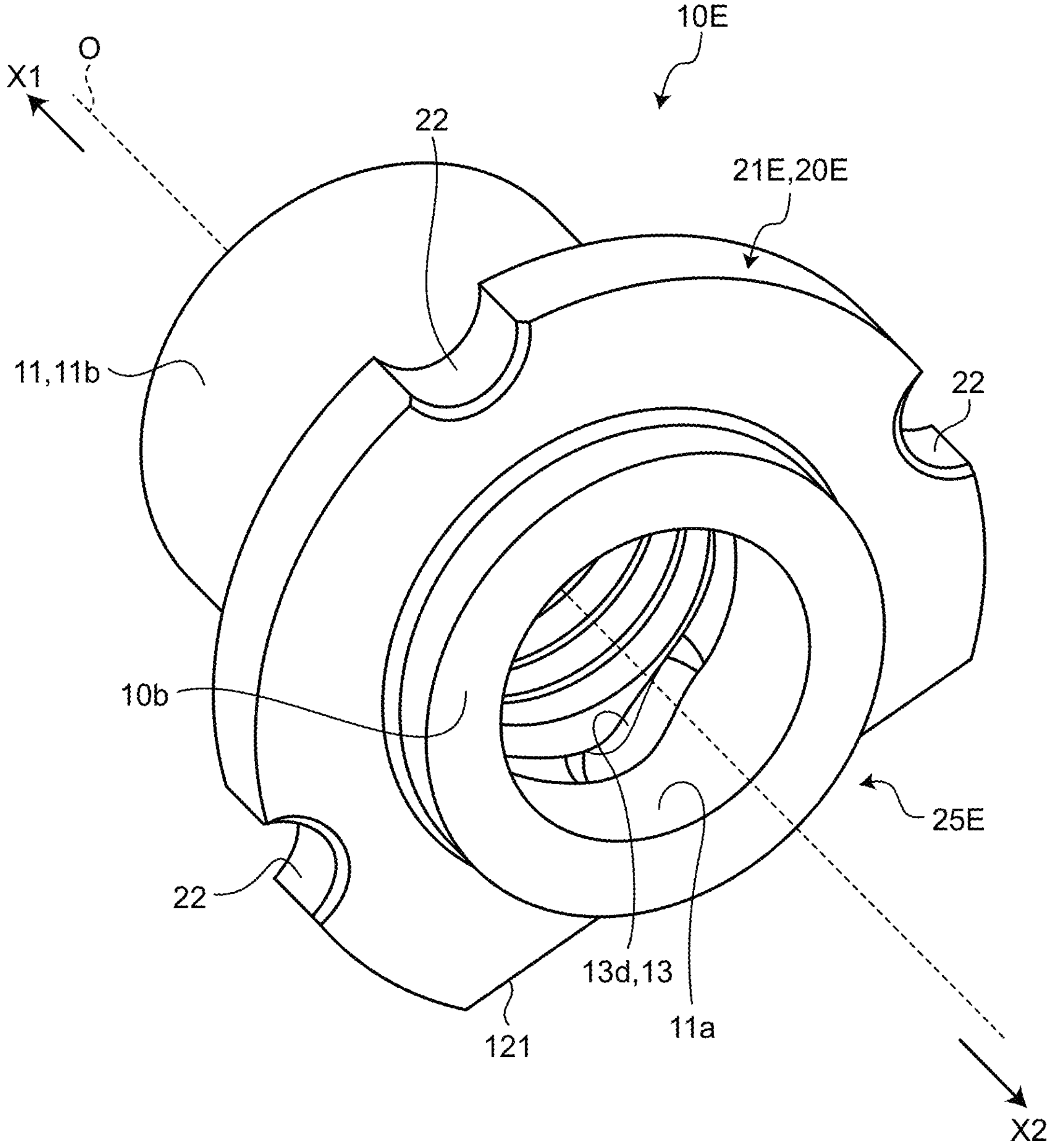
FIG. 8 is a perspective view of a nut of a third modification example as viewed in a second direction.
Figure 9:
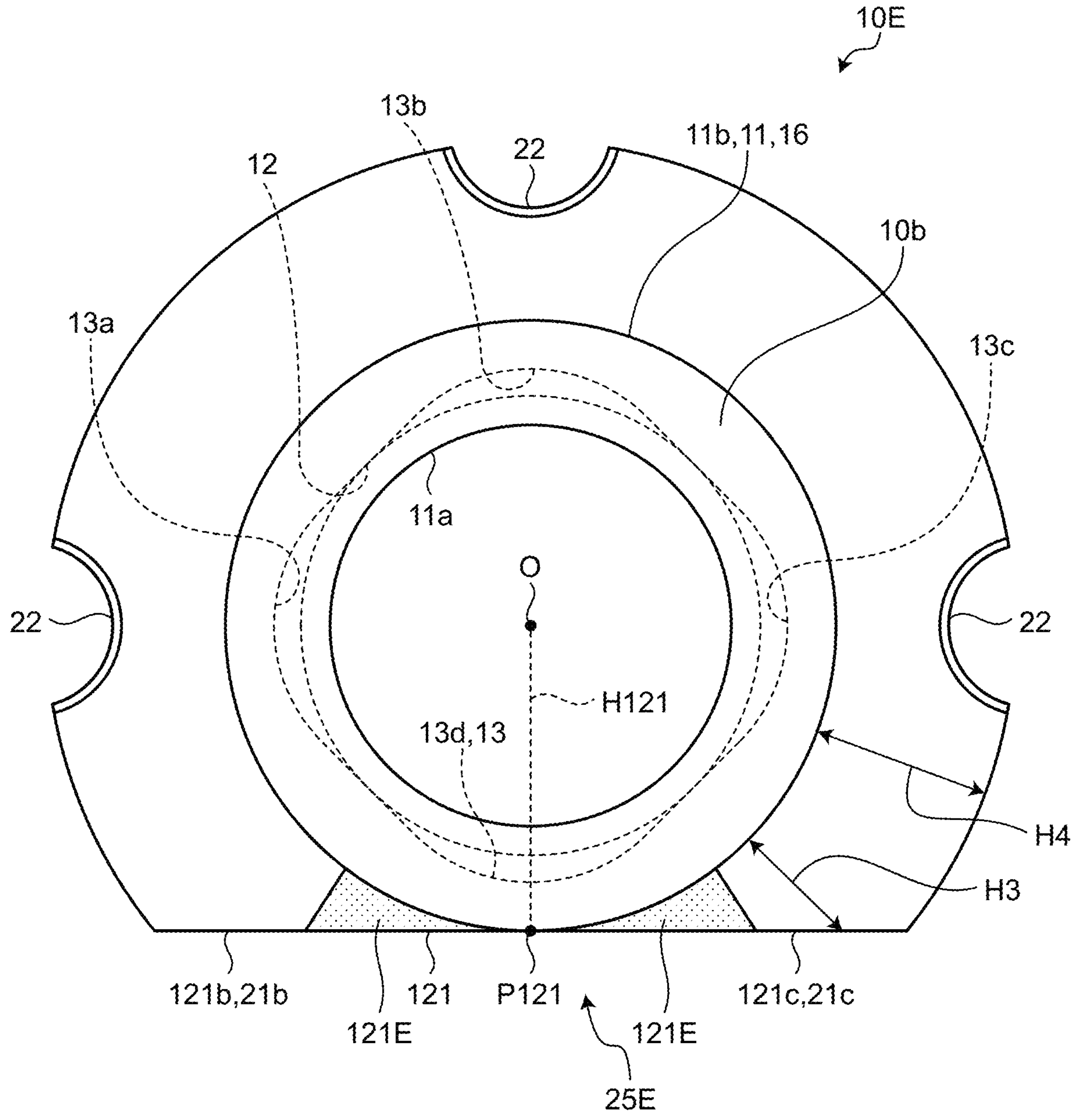
FIG. 9 is a view of the nut of the third modification example as viewed in the second direction.
Figure 10:
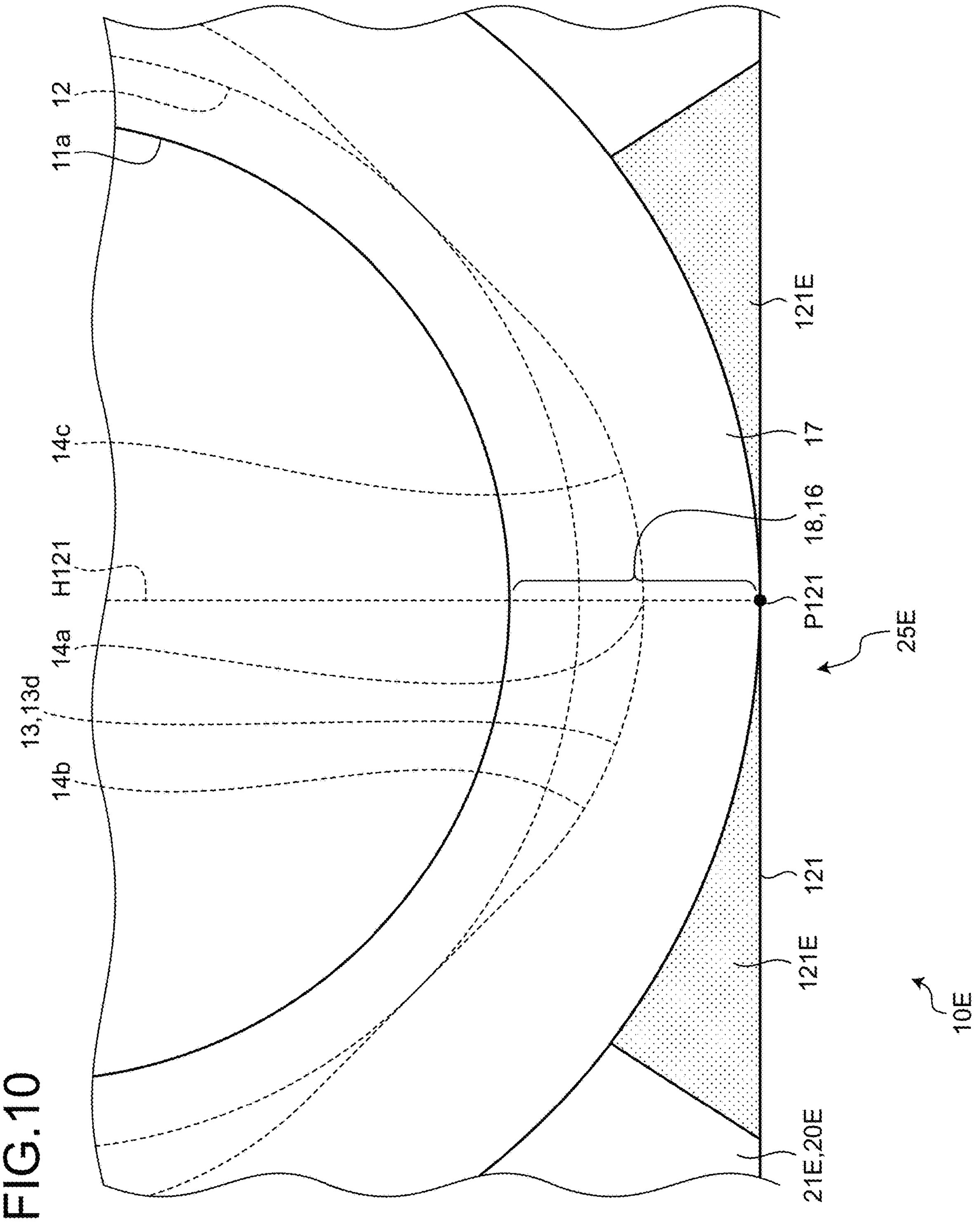
FIG. 10 is an enlarged view of FIG. 9.

FIG. 8 is a perspective view of a nut of the third modification example as viewed in a second direction. FIG. 9 is a view of a nut of the third modification example as viewed in the second direction. FIG. 10 is an enlarged view of a part of FIG. 9. Note that as illustrated in FIG. 8, in the third modification example, an example in which a second end surface 10*b* of a nut 10E protrudes in a second direction X2 more than a flange 20E (partial flange 21E) will be described. That is, the flange 20E (partial flange 21E) of the third modification example is arranged slightly closer to a first direction X1 than an end of a nut main body 11 in the second direction X2. However, in the present disclosure, the flange 20E may be arranged at the end of the nut main body 11 in the second direction X2. Furthermore, although sliding groove surfaces 22 of the third modification example are not arranged at equal intervals in a circumferential direction, the sliding groove surfaces 22 may be arranged at equal intervals in the circumferential direction in the present disclosure.

As illustrated in FIG. 8 and FIG. 9, the flange 20E of the nut 10E of the third modification example is common to the partial flange 21A of the first modification example (see FIG.

6) in a point that there is one partial flange 21E. That is, there is only one relief space 25E in the third modification example.

On the other hand, as illustrated in FIG. 9, the partial flange 21E of the third modification example is different from the partial flange of the first modification example in a point that a shape thereof is a D shape when viewed in an axial direction. That is, in the partial flange 21E of the third modification example, a side surface 121*b* located at one end 21*b* in the circumferential direction and a side surface 121*c* located at the other end 21*c* in the circumferential direction are linearly connected. Thus, the relief space 25E of the third modification example is a space extending in the circumferential direction between the one end 21*b* and the other end 21*c* in the circumferential direction of the partial flange 21E. Hereinafter, a linear side surface obtained by combination of the side surface 121*b* and the side surface 121*c* is referred to as a linear side surface 121.

When viewed in the axial direction, the linear side surface 121 is tangential to an outer peripheral surface 11*b* of the nut main body 11 (annular portion 16). Hereinafter, when viewed in the axial direction, a virtual straight line connecting a contact point P121 between the linear side surface 121 and the outer peripheral surface 11*b* and a central axis O is referred to as a virtual line H121.

A distance H3 between the outer peripheral surface 11*b* of the annular portion 16 and the linear side surface 121 decreases toward the contact point P121. In other words, a thickness in a radial direction of a portion of the partial flange 21E in which portion the linear side surface 121 is provided becomes smaller toward the contact point P121. Note that the thickness of the partial flange 21E in the radial direction is H4 in the third modification example. Hereinafter, a portion of the partial flange 21E a thickness of which portion in the radial direction is ½ or less of H4 is referred to as an incomplete flange 121E (see a range painted with dots in FIG. 9).

As illustrated in FIG. 10, in the third modification example, a flange non-connected region 18 (portion of the annular portion 16 in which portion the relief space 25 is arranged on an outer side in the radial direction and which portion is not connected to a partial flange 21) is a portion overlapping with the virtual line H121 in the annular portion 16.

In the third modification example, a fourth S-shaped groove surface 13*d* of four S-shaped groove surfaces 13 is arranged in the annular portion 16. A bottom surface 14*a* of the fourth S-shaped groove surface 13*d* which surface is the most recessed to the outer side in the radial direction is arranged in the flange non-connected region 18. Thus, the bottom surface 14*a* of the fourth S-shaped groove surface 13*d* can release a large amount of thick portion of the nut main body 11 to the outer side in the radial direction by forging.

On the other hand, inclined surfaces 14*b* and 14*c* of the fourth S-shaped groove surface 13*d* are arranged in a flange connected region 17. However, a portion arranged on the outer side in the radial direction of the flange connected region 17 is the incomplete flange 121E having a small thickness in the radial direction. Thus, the thick portion for molding the inclined surfaces 14*b* and 14*c* can be released to the outer side in the radial direction. From the above, the fourth S-shaped groove surface 13*d* can be molded by forging.

Although the linear side surface 121 is a tangent to the outer peripheral surface 11*b* of the annular portion 16 in the third modification example, a linear side surface 121 may not be a tangent to an outer peripheral surface 11*b* of an annular portion 16 in the present disclosure. In other words, the linear side surface 121 may be arranged on an outer side in a radial direction compared to the outer peripheral surface 11*b* of the annular portion 16, and there may be no intersection between the linear side surface 121 and the outer peripheral surface 11*b* (see a nut 10F in FIG. 12). In such a case, the annular portion 16 has no flange non-connected region 18, and there are only flange connected regions 17. When a portion arranged on the outer side in the radial direction of an S-shaped groove surface 13 is an incomplete flange 121E, the S-shaped groove surface 13 can be molded by forging.

Other than the case where the linear side surface 121 and the outer peripheral surface 11*b* have no intersection, there may be two intersections between a linear side surface 121 and an outer peripheral surface 11*b* of an annular portion 16 in the present disclosure. In other words, in the linear side surface 121, a part of the outer peripheral surface 11*b* of the annular portion 16 may be notched, and a shape of the outer peripheral surface 11*b* of the annular portion 16 may be a D shape when viewed in an axial direction.

Furthermore, in the third modification example, ends in a length direction of the S-shaped groove surface 13 (entrance/exit of the S-shaped groove surface 13) are arranged on an inner side in the radial direction of the incomplete flange 121E. However, in the present disclosure, ends in a length direction of an S-shaped groove surface 13 may not be arranged on an inner side in a radial direction of an incomplete flange 121E. As described in the second modification example, this is because a groove surface having a recess amount of 50% or less with respect to the maximum recess amount N of a bottom surface 14*a* (see FIG. 7) can be molded even when being arranged on the inner side in the radial direction of a partial flange 20E (excluding a range of the incomplete flange 121E).

Furthermore, although the partial flange having the one linear side surface 121 is described as the example in the third modification example, the present disclosure may include a partial flange which has two linear side surface portions 121 and in which the two linear side surface portions 121 are parallel to each other. That is, the present disclosure may include a partial flange having a plurality of linear side surfaces 121. Furthermore, although the partial flange of the third modification example is provided with the sliding groove surface 22 and used as a detent, utilization for other purposes is also possible in the present disclosure.

The first embodiment and the modification examples thereof have been described above. Here, although the partial flanges of the first embodiment and the modification examples are used as the detents of the nut, the present disclosure is not limited thereto. Next, an example in which the partial flange is used for a purpose as other than the detent will be described.

Second Embodiment

Figure 11:
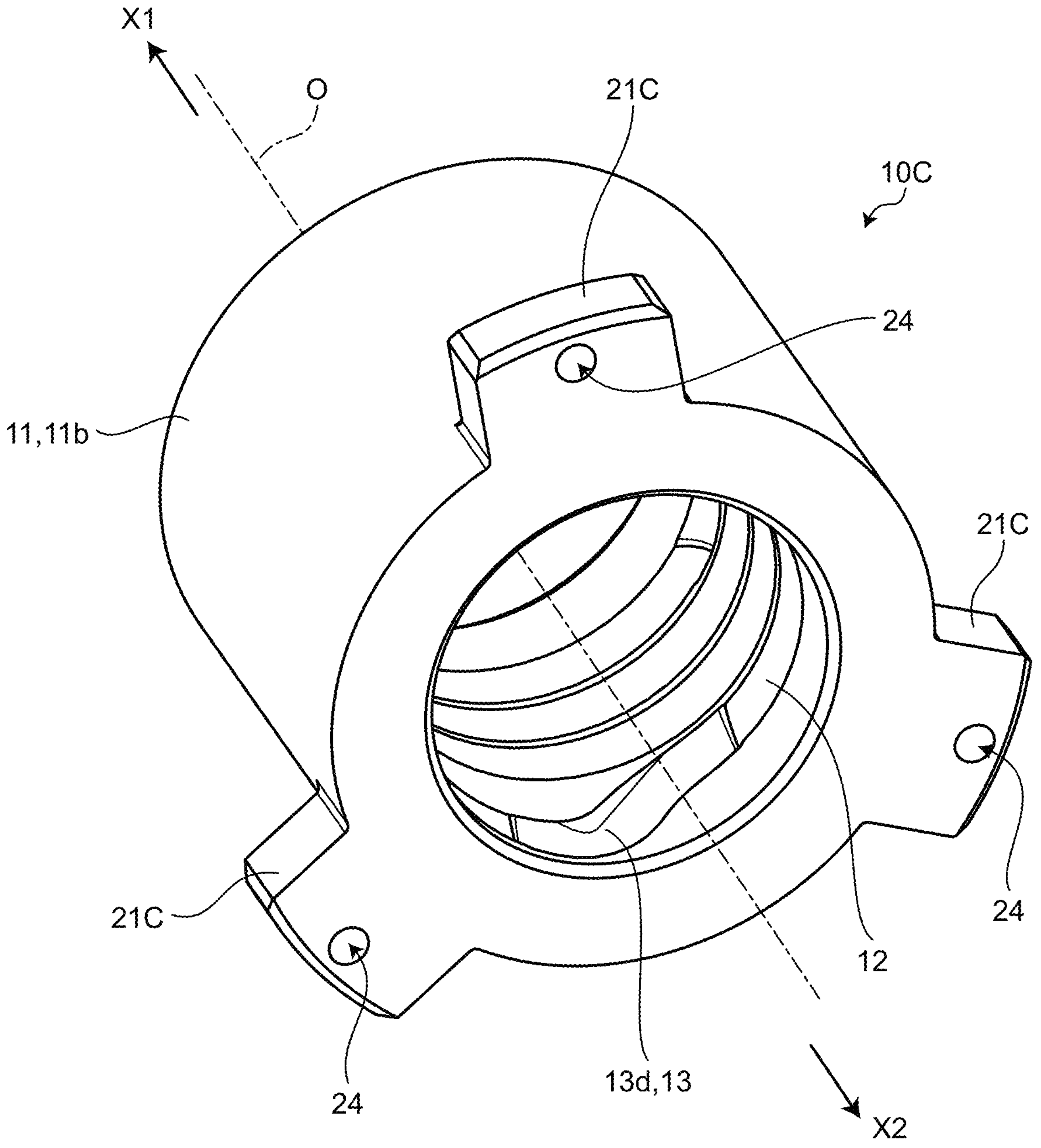
FIG. 11 is a perspective view of a nut of a second embodiment as viewed in a second direction.

FIG. 11 is a perspective view of a nut of the second embodiment as viewed in a second direction. As illustrated in FIG. 11, in the second embodiment, a flange 20C of a nut 10C is common to the first embodiment in a point of including three partial flanges 21C. On the other hand, the partial flanges 21C are different from the partial flanges 21 of the first embodiment in a point that a sliding groove surface 22 penetrated by a shaft 107 is not provided. In addition, the partial flanges 21C are different from the partial flanges 21 of the first embodiment in a point that a through hole 24 penetrating in an axial direction is provided.

In the second embodiment, the nut 10C is arranged in a manner of facing planetary gears 114 of a planetary gear mechanism 110 in an axial direction. Then, a transmission shaft 115 (see FIG. 1) of the planetary gear mechanism 110 is inserted into the through hole 24 of each of the partial flanges 21C. Thus, a rotary motion of the planetary gears 114 that rotate (revolve) around a central axis O is input to the three partial flanges 21C, and the nut 10C rotates. From the above, the three partial flanges 21C of the second embodiment are used as a carrier 116 (see FIG. 1) of the planetary gear mechanism 110. According to the second embodiment, the carrier 116 (see FIG. 1) is unnecessary, and the number of components can be reduced. Furthermore, in the second embodiment, the nut 10C rotates, and a screw shaft 2 moves in the axial direction. Note that although being the through hole 24 in the present embodiment, a hole provided in each of the partial flanges 21C may be a blind hole (hole that does not penetrate).

Figure 12:
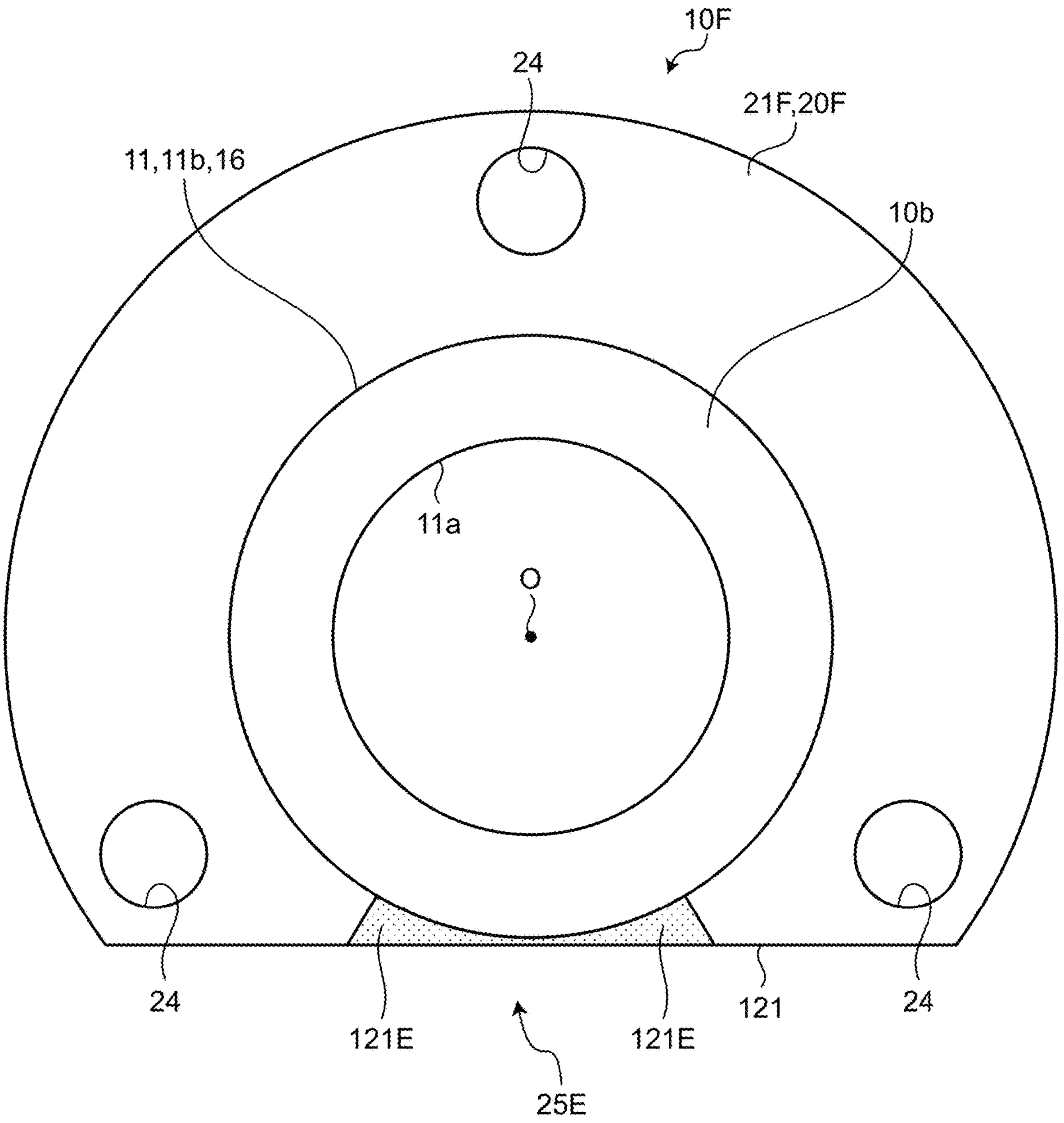
FIG. 12 is a view of a nut of a fourth modification example as viewed in a second direction.

Note that although the example in which the through holes 24 are applied to the nut 10C having the plurality of (three) partial flanges 21C has been described in the second embodiment, the present disclosure is not limited thereto. For example, a through hole 24 may be provided in the nut 10A having the partial flange 21A and described in the first modification example. FIG. 12 is a view of a nut of a fourth modification example as viewed in a second direction. Alternatively, as illustrated in FIG. 12, a flange 20F of a nut 10F of the fourth modification example is a D-shaped partial flange 21F having an incomplete flange 121E as described in the third modification example. In the present disclosure, the through hole 24 may be provided in the D-shaped partial flange 21F.

Third Embodiment

Figure 13:
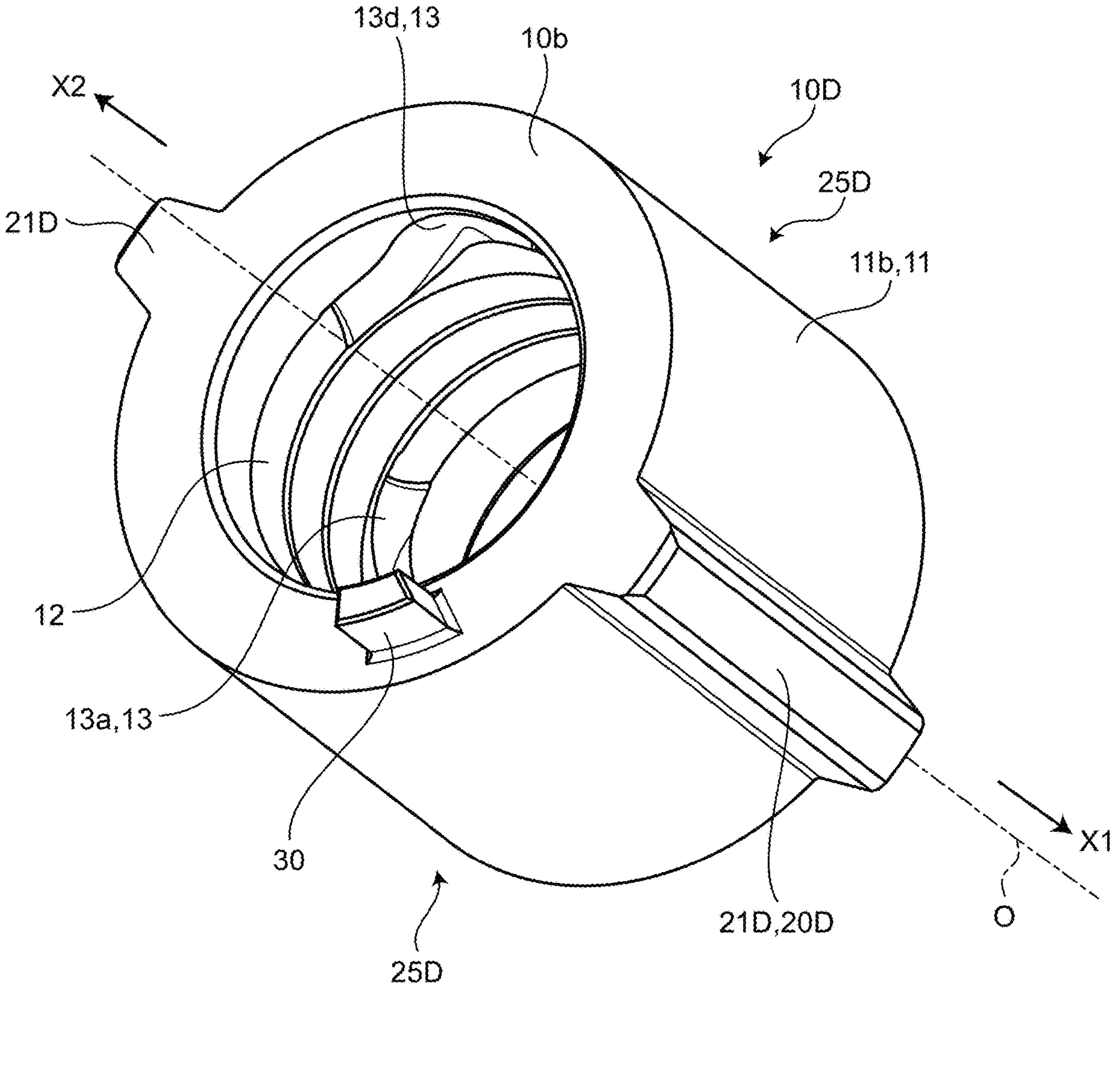
FIG. 13 is a perspective view of a nut of a third embodiment as viewed in a second direction.
Figure 14:
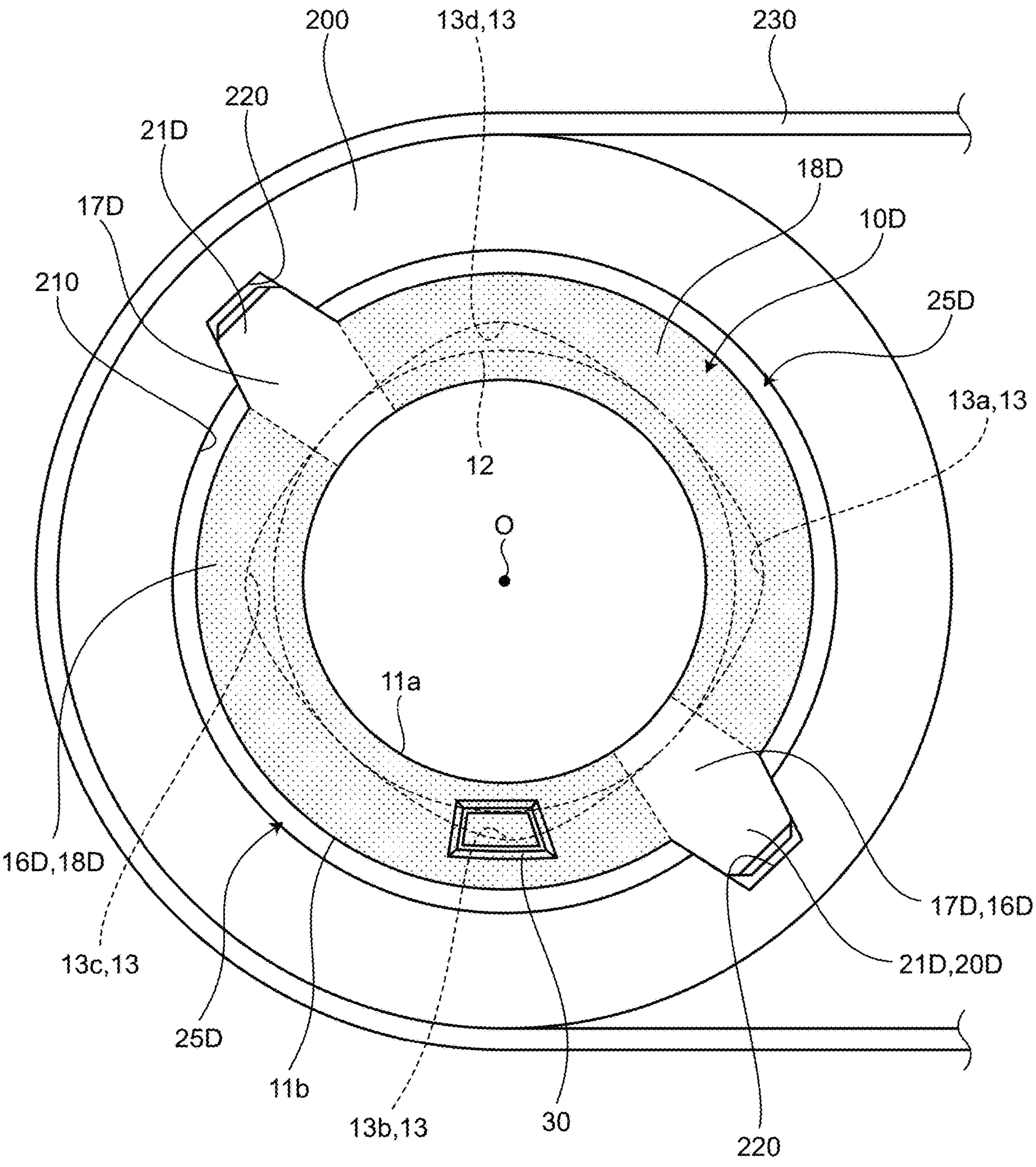
FIG. 14 is a view of the nut of the third embodiment as viewed in the second direction.

FIG. 13 is a perspective view of a nut of the third embodiment as viewed in a second direction. FIG. 14 is a view of the nut of the third embodiment as viewed in the second direction. As illustrated in FIG. 13, a nut 10D of the third embodiment is different from the nut 10 of the first embodiment in a point that there are two partial flanges 21D. The two partial flanges 21D are arranged in such a manner as to be point-symmetric with a central axis O as a center. That is, the two partial flanges 21D are arranged in a manner of being shifted by 180 degrees in a circumferential direction. Thus, two relief spaces 25D are provided in the third embodiment.

A length in an axial direction of the partial flanges 21D is the same as a length in the axial direction of a nut main body 11. As illustrated in FIG. 14, the nut 10D is inserted into an inner peripheral side of a driven pulley 200. In addition, the partial flanges 21D are fitted into grooves 220 provided in an inner peripheral surface 210 of the driven pulley 200. When power is transmitted from a belt 230 to the driven pulley 200, the nut 10D rotates integrally with the driven pulley 200, and a screw shaft 2 (see FIG. 1) moves in the axial direction. From the above, the two partial flanges 21D of the third embodiment are used as detents that restrict a relative rotation with respect to the driven pulley 200.

In addition, the entire nut main body 11 in the axial direction is an annular portion 16 in the third embodiment. In other words, all of four S-shaped groove surfaces 13 are arranged on an inner side in a radial direction of the two partial flanges 21D and the two relief spaces 25D.

As illustrated in FIG. 14, the annular portion 16 is divided into two flange connected regions 17D and two flange non-connected regions 18D. The four S-shaped groove surfaces 13 (first S-shaped groove surface 13*a*, second S-shaped groove surface 13*b*, third S-shaped groove surface 13*c*, and fourth S-shaped groove surface 13*d*) are arranged at intervals of 90 degrees as in the first embodiment. All of the four S-shaped groove surfaces 13 are provided in an inner peripheral surface 11*a* of the flange non-connected regions 18D. In such a manner, the S-shaped groove surfaces 13 do not need to be molded in a manner of being shifted in the axial direction with respect to a flange 20D (partial flanges 21D) also in the third embodiment. Thus, it is possible to avoid an increase in size of the nut 10 in the axial direction.

Note that the number of the S-shaped groove surfaces 13 arranged on the inner side in the radial direction of the relief spaces 25 is one of the four S-shaped groove surfaces 13 in the first embodiment, and all of the four S-shaped groove surfaces 13 in the third embodiment. However, two or three of the plurality of (four) S-shaped groove surfaces 13 may be arranged in the present disclosure. That is, the present disclosure is not limited to the examples described in the embodiments as long as at least one or more S-shaped groove surfaces 13 among the plurality of S-shaped groove surfaces 13 are arranged on the inner side in the radial direction of the relief spaces 25.

Although each of the embodiments and each of the modification examples have been described above, an outer diameter of the nut main body 11 and an outer diameter of the annular portion 16 may not be the same in the present disclosure. That is, the outer diameter of the annular portion 16 may be larger or smaller than the outer diameter of the nut main body 11.

Note that the present disclosure may be a combination of the following configurations.

(1)

A nut including:

a cylindrical nut main body penetrated by a screw shaft;

a plurality of inner peripheral raceway surfaces and a plurality of S-shaped groove surfaces recessed to an outer side in a radial direction from an inner peripheral surface of the nut main body; and a flange that protrudes to the outer side in the radial direction from an outer peripheral surface of the nut main body, in which the flange has at least one or more partial flanges extending only in a part of a circumferential direction along the outer peripheral surface of the nut main body, a space between one end and another end of the partial flange in the circumferential direction in a case where the number of the partial flanges is one, and a space between the partial flanges adjacent to each other in the circumferential direction in a case where the number of the partial flanges is two or more is a relief space to which a thick portion of the nut main body is released, and one of the plurality of S-shaped groove surfaces is arranged on an inner side in the radial direction of the relief space.

REFERENCE SIGNS LIST

1 BALL SCREW DEVICE

2 SCREW SHAFT

4 SCREW SHAFT MAIN BODY

5 OUTER PERIPHERAL RACEWAY SURFACE
7 RACEWAY
8 BALL
10, 10B, 10C, 10D, 10E, 10F NUT
11 NUT MAIN BODY
12 INNER PERIPHERAL RACEWAY SURFACE
13 S-SHAPED GROOVE SURFACE
14*a* BOTTOM SURFACE
14*b*, 14*c* INCLINED SURFACE
16 ANNULAR PORTION
17, 17A, 17B FLANGE CONNECTED REGION
18, 18A, 18B FLANGE NON-CONNECTED REGION
20, 20A, 20B, 20C, 20D FLANGE
21, 21A, 21B, 21C, 21D PARTIAL FLANGE
22 SLIDING GROOVE SURFACE
24 THROUGH HOLE (HOLE)
25, 25A, 25B, 25D RELIEF SPACE
26 CORNER PORTION
30 PROTRUSION
31 FIRST CONTACT SURFACE
50 PISTON
60 STOPPER
63 SECOND CONTACT SURFACE
100 ELECTRIC ACTUATOR
101 HOUSING
102 CYLINDER
110 PLANETARY GEAR MECHANISM
121 INCOMPLETE FLANGE
200 DRIVEN PULLEY
230 BELT

The invention claimed is:

1. A nut comprising:

a cylindrical nut main body penetrated by a screw shaft;

a plurality of inner peripheral raceway surfaces and a plurality of S-shaped groove surfaces recessed to an outer side in a radial direction from an inner peripheral surface of the nut main body; and a flange that protrudes to the outer side in the radial direction from an outer peripheral surface of the nut main body, wherein the flange has at least one or more partial flanges extending only in a part of a circumferential direction along the outer peripheral surface of the nut main body, a space between one end and another end of the partial flange in the circumferential direction in a case where a number of the partial flanges is one, and a space between the partial flanges adjacent to each other in the circumferential direction in a case where the number of the partial flanges is two or more is a relief space to which a thick portion of the nut main body is released, one of the plurality of S-shaped groove surfaces is arranged on an inner side in the radial direction of the relief space, and a shaft supported by a housing and extending in an axial direction parallel to the screw shaft is arranged on the outer side in the radial direction of the partial flange, and a sliding groove surface that is recessed to the inner side in the radial direction and that houses the shaft inside is provided in an outer peripheral surface of the partial flange.

2. The nut according to claim 1, wherein the plurality of S-shaped groove surfaces is arranged at equal intervals in the circumferential direction.

3. The nut according to claim 1, wherein the flange has two or more of the partial flanges arranged at equal intervals in the circumferential direction.

4. The nut according to claim 1, wherein a protrusion that protrudes in an axial direction and comes into contact with a stopper that does not perform a relative rotation with the screw shaft is provided on one end surface of the nut main body, and the S-shaped groove surface arranged closest to the protrusion in the axial direction among the plurality of S-shaped groove surfaces is arranged in a manner of being shifted in the circumferential direction with respect to the protrusion.

5. A ball screw device comprising:

a screw shaft;

the nut according to claim 1; and a plurality of balls arranged between the screw shaft and the nut.

6. A nut comprising:

a cylindrical nut main body penetrated by a screw shaft;

a plurality of inner peripheral raceway surfaces and a plurality of S-shaped groove surfaces recessed to an outer side in a radial direction from an inner peripheral surface of the nut main body; and a flange that protrudes to the outer side in the radial direction from an outer peripheral surface of the nut main body, wherein the flange has at least one or more partial flanges extending only in a part of a circumferential direction along the outer peripheral surface of the nut main body, a space between one end and another end of the partial flange in the circumferential direction in a case where a number of the partial flanges is one, and a space between the partial flanges adjacent to each other in the circumferential direction in a case where the number of the partial flanges is two or more is a relief space to which a thick portion of the nut main body is released, one of the plurality of S-shaped groove surfaces is arranged on an inner side in the radial direction of the relief space, the partial flange has a side surface facing the circumferential direction, when a virtual straight line connecting an inner end of the side surface in the radial direction and a central axis of the nut is assumed as a boundary line, the nut main body is divided into a flange connected region where the partial flange is arranged on the outer side in the radial direction, and a flange non-connected region where the relief space is arranged on the outer side in the radial direction, and in the one of the S-shaped groove surfaces arranged on an inner side in the radial direction of the relief space, an entire S-shaped groove surface in a length direction is arranged in the flange non-connected region.

7. The nut according to claim 1, wherein the partial flange has a side surface facing the circumferential direction, when a virtual straight line connecting an inner end of the side surface in the radial direction and a central axis of the nut is assumed as a boundary line, the nut main body is divided into a flange connected region where the partial flange is arranged on the outer side in the radial direction, and a flange non-connected region where the relief space is arranged on the outer side in the radial direction, in the one of the S-shaped groove surfaces arranged on an inner side in the radial direction of the relief space, a central portion of the S-shaped groove surface in the length direction is arranged in the flange non-connected region, and an end in the length direction is arranged in the flange connected region, and a recess amount of a portion of the one of the S-shaped groove surfaces arranged in the flange connected region is 50% or less with respect to a maximum recess amount of the one of the S-shaped groove surfaces.

8. The nut according to claim 1, wherein the partial flange has a side surface facing the circumferential direction, when a virtual straight line connecting an inner end of the side surface in the radial direction and a central axis of the nut is assumed as a boundary line, the nut main body is divided into a flange connected region where the partial flange is arranged on the outer side in the radial direction, and a flange non-connected region where the relief space is arranged on the outer side in the radial direction, in the one of the S-shaped groove surfaces arranged on an inner side in the radial direction of the relief space, a central portion of the S-shaped groove surface in the length direction is arranged in the flange non-connected region, and an end in the length direction is arranged in the flange connected region, and a recess amount of a portion of the one of the S-shaped groove surfaces arranged in the flange connected region is 20% or less with respect to a maximum recess amount of the one of the S-shaped groove surfaces.

9. The nut according to claim 1, wherein the partial flange includes one end side surface located at the one end of the partial flange in the circumferential direction, and another end side surface located at the another end of the partial flange in the circumferential direction, and the one end side surface and the another end side surface are linearly connected to define a linear side surface.

10. The nut according to claim 9, wherein the partial flange is one, and the partial flange is a D shape when viewed in an axial direction parallel to the screw shaft.

* * * * *